United States Patent
Tanaka et al.

(10) Patent No.: US 9,065,081 B2
(45) Date of Patent: Jun. 23, 2015

(54) TITANIUM MATERIAL FOR SOLID POLYMER FUEL CELL SEPARATOR USE AND METHOD OF PRODUCTION OF SAME

(75) Inventors: Koki Tanaka, Tokyo (JP); Kazuhiro Takahashi, Tokyo (JP); Hiroshi Kihira, Tokyo (JP); Kiyonori Tokuno, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 161 days.

(21) Appl. No.: 13/261,164
(22) PCT Filed: Jul. 28, 2010
(86) PCT No.: PCT/JP2010/063134
§ 371 (c)(1),
(2), (4) Date: Jan. 31, 2012
(87) PCT Pub. No.: WO2011/016465
PCT Pub. Date: Feb. 10, 2011

(65) Prior Publication Data
US 2012/0171468 A1 Jul. 5, 2012

(30) Foreign Application Priority Data
Aug. 3, 2009 (JP) .................... 2009-180885

(51) Int. Cl.
*C25D 11/02* (2006.01)
*B32B 15/04* (2006.01)
(Continued)

(52) U.S. Cl.
CPC .............. *H01M 8/0206* (2013.01); *H01M 2/18* (2013.01); *H01M 2/164* (2013.01); *H01M 2/1646* (2013.01);
(Continued)

(58) Field of Classification Search
None
See application file for complete search history.

(56) References Cited

U.S. PATENT DOCUMENTS 6,863,987 B2 * 3/2005 Kaneko et al. ............. 428/472.1
6,893,765 B1   5/2005 Nishida et al.
(Continued)

FOREIGN PATENT DOCUMENTS

JP  11-121018  4/1999
JP  11-126621  5/1999
(Continued)

OTHER PUBLICATIONS

STIC search.*
(Continued)

*Primary Examiner* — Humera Sheikh
*Assistant Examiner* — Seth Dumbris
(74) *Attorney, Agent, or Firm* — Kenyon & Kenyon LLP

(57) ABSTRACT

The present invention provides titanium material for a separator for solid polymer fuel cell use comprised of titanium which has a surface layer part where conductive compound particles are affixed, which is excellent in contact resistance between the separator surface and carbon paper and in durability, and which is low in cost and superior in recyclability and a method of production of the same. This titanium material for separator use has on the surface of the titanium base material a film comprised of the titanium compound particles made of titanium carbide, titanium nitride, or titanium carbonitride and titanium oxide. The film has a thickness of 0.1 to 1 μm, the coverage rate is an area percentage of 20% or more, and the contents of carbon and nitrogen in the film total 5 to 40 at %. The titanium material for a separator is produced by annealing or shot blasting and pickling.

4 Claims, 2 Drawing Sheets

(51) Int. Cl.
*H01M 2/16* (2006.01)
*H01M 8/02* (2006.01)
*H01M 2/18* (2006.01)
*H01M 8/10* (2006.01)

(52) U.S. Cl.
CPC ............ *H01M 2/16* (2013.01); *Y10T 428/265* (2015.01); *Y10T 428/256* (2015.01); *H01M 8/0228* (2013.01); *H01M 2008/1095* (2013.01); *Y02E 60/50* (2013.01)

(56) References Cited

U.S. PATENT DOCUMENTS

| | | | |
|---|---|---|---|
| 7,594,973 B2* | 9/2009 | Takahashi et al. | 148/421 |
| 2003/0022053 A1* | 1/2003 | Anderson et al. | 429/37 |
| 2007/0040278 A1* | 2/2007 | Furuya | 257/764 |
| 2007/0243429 A1* | 10/2007 | Uchiyama et al. | 429/18 |
| 2009/0087558 A1 | 4/2009 | Aoyama et al. | |
| 2009/0130300 A1* | 5/2009 | Suzuki et al. | 427/115 |
| 2009/0197143 A1 | 8/2009 | Kaneko et al. | |
| 2009/0226785 A1* | 9/2009 | Kihira et al. | 429/30 |
| 2011/0033784 A1* | 2/2011 | Ljungcrantz et al. | 429/524 |
| 2011/0070529 A1* | 3/2011 | Dadheech et al. | 429/528 |

FOREIGN PATENT DOCUMENTS

| | | |
|---|---|---|
| JP | 11-126622 | 5/1999 |
| JP | 11-219713 | 8/1999 |
| JP | 11-260383 | 9/1999 |
| JP | 2000-021419 | 1/2000 |
| JP | 2000-256808 | 9/2000 |
| JP | 2000-260439 | 9/2000 |
| JP | 2000-309854 | 11/2000 |
| JP | 2001-6713 | 1/2001 |
| JP | 2001-250565 | 9/2001 |
| JP | 2001-357862 | 12/2001 |
| JP | 2003-123783 | 4/2003 |
| JP | 2003-193206 | 7/2003 |
| JP | 2003-223904 | 8/2003 |
| JP | 2004-2960 | 1/2004 |
| JP | 2004-107704 | 4/2004 |
| JP | 2004-124197 | 4/2004 |
| JP | 2004-156132 | 6/2004 |
| JP | 2004-232074 | 8/2004 |
| JP | 2004-265695 | 9/2004 |
| JP | 2004-269969 | 9/2004 |
| JP | 2004-273370 | 9/2004 |
| JP | 2004-306128 | 11/2004 |
| JP | 2006-140095 * | 6/2006 ............ H01M 8/02 |
| JP | 2006-190643 | 7/2006 |
| JP | 2007-59375 | 3/2007 |
| JP | 2008-176988 | 7/2008 |
| JP | 2008-251296 * | 10/2008 ............ H01M 8/02 |
| JP | 2009-123376 | 6/2009 |
| WO | WO 01/22513 A1 | 3/2001 |
| WO | WO 2007/119842 A1 | 10/2007 |
| WO | WO 2007/145377 A1 | 12/2007 |

OTHER PUBLICATIONS

Canadian Office Action dated Nov. 23, 2012, issued in corresponding Canadian Application No. 2,769,855.

International Search Report dated Oct. 19, 2010 issued in corresponding PCT Application No. PCT/JP2010/063134.

* cited by examiner

PRIOR ART

TITANIUM MATERIAL FOR SOLID POLYMER FUEL CELL SEPARATOR USE AND METHOD OF PRODUCTION OF SAME

This application is a national stage application of International Application No. PCT/JP2010/063134, filed Jul. 28, 2010, which claims priority to Japanese Application No. 2009-180885, filed Aug. 3, 2009, the content of which is incorporated herein by reference.

TECHNICAL FIELD

The present invention relates to a titanium material for solid polymer fuel cell separator use which may be used for automobiles and small-sized power generation systems etc. and a method of production of the same.

BACKGROUND ART

A solid polymer fuel cell is a system for taking out electric power by using, as a fuel, pure hydrogen, hydrogen gas obtained by modifying alcohol, etc. and electrochemically controlling the reaction between the hydrogen and the oxygen in the air.

A solid polymer fuel cell uses a solid hydrogen ion selective transmission type organic film as an electrolyte, so compared with conventional alkali type fuel cells, phosphoric acid type fuel cells, molten carbonate type fuel cells, solid electrolyte type fuel cells, and other such fuel cells which use electrolytes comprised of aqueous solution type electrolytes or molten salt type electrolytes and other fluid media, greater compactness becomes possible. Development efforts are underway for application to electric vehicles etc.

The configuration of a typical solid polymer fuel cell is shown in FIG. 1. The solid polymer fuel cell 1 is comprised of a solid polymer film 2 for forming an electrolyte, catalyst electrode parts (3a, 3b) comprised of carbon fine particles and precious metal ultra fine particles provided on the two surfaces of this solid polymer film 2, current collectors comprised of felt-like carbon fiber aggregates which have the functions of taking out electrons produced at the anode side catalyst electrode part 3a and feeding the reaction gas of oxygen-based gas or hydrogen-based gas to the catalyst electrode parts (3a, 3b) (usually called "carbon paper" (4a, 4b)), and separators (5a, 5b) which receive current from the carbon paper (4a, 4b) and separate the oxygen-based gas and hydrogen-based gas, all stacked together.

The basic principle of a solid polymer fuel cell 1 is as follows: That is, in a solid polymer fuel cell 1, the fuel of hydrogen gas ($H_2$) 8 is supplied from the anode side, passes through the gas diffusion layer of the carbon paper 4a, and, at the anode side 6 catalyst electrode part 3a, breaks down into hydrogen ions ($H^+$) and electrons ($e^-$) by the reaction of $H_2 \rightarrow 2H^+ + 2e^-$. The hydrogen ions ($H^+$) pass through the electrolyte of the solid polymer membrane 2 and reach the cathode side 7 catalyst electrode part 3b.

On the other hand, the electrons ($e^-$) 10 pass from the anode side carbon paper 4a through the anode side separator 5a and conductor 16 to reach the cathode side separator 5b and further pass through the cathode side carbon paper 4b to reach the cathode side catalyst electrode part 3b. At the cathode side catalyst electrode part 3b, the hydrogen ions ($H^+$) which have arrived through the solid polymer film 2 and the electrons ($e^-$) which have arrived through the conductor 16 react with the oxygen ($O_2$) in the air 9 which is fed from the cathode side 7 ($2H^+ + 2e^- + 1/2 O_2 \rightarrow H_2O$) whereby water ($H_2O$) is produced. The produced water ($H_2O$) moves through the cathode side carbon paper 4b to the cathode side separator 5b. At the time of this reaction, the electrons ($e^-$) 10 which were produced at the anode side 6 catalyst electrode part 3a pass through the carbon paper 4a and from the anode side 6 separator 5a through the conductor 16 to flow to the cathode side 7 separator 5b whereby current and voltage are generated across the electrodes of the cathode side and anode side of the catalyst electrode parts 3.

The solid polymer film 2 is comprised of an electrolyte having a strong acidity immobilized in a film and functions as an electrolyte passing hydrogen ions ($H^+$) by control of the dew point inside of the battery.

The component member separator 5 of the solid polymer fuel cell 1 has the role of separating the two types of reaction gases, that is, the cathode side 7 air 9 and the anode side 6 hydrogen gas 8, and providing flow paths for supplying these reaction gases and the role of discharging the water produced by the reaction from the cathode side 7 when stacking basic units of the solid polymer fuel cell shown in FIG. 1.

Further, in general, the solid polymer fuel cell 1 uses a solid polymer membrane made of an electrolyte exhibiting a strong acidity. Due to the reaction, it operates at a temperature of about 150° C. or less and generates water. For this reason, the separator 5 for solid polymer fuel cell use is required to have, as material properties, corrosion resistance and durability and is required to have good electroconductivity for efficient conduction of current through the carbon paper 4 and low contact resistance with carbon paper.

In the past, as the material for the separator for a solid polymer fuel cell, much use has been made of carbon-based materials. However, separators made of carbon-based materials cannot be made thin due to problems of brittleness and therefore obstruct increased compactness. In recent years, breakage-resistant separators made of carbon-based materials have also been developed, but they are expensive in cost, so are disadvantageous economically.

On the other hand, separators using metal materials are free from problems of brittleness compared with carbon-based materials, so in particular enable increased compactness of solid polymer fuel cell systems. Separators using the low cost material stainless steel or titanium alloy or other metal materials are being developed. Numerous ones have been proposed (for example, see PLTs 1, 2, and 12 to 20).

However, separators made of stainless steel or separators made of titanium or titanium alloy become larger in contact resistance with the carbon paper due to the passivation film formed on the surfaces, so had the problem of greatly reducing the energy efficiency of the fuel cells.

For this reason, numerous methods for reducing the contact resistance between member surfaces and carbon paper have been proposed for stainless-steel separators and titanium and titanium-alloy separators in the past.

For example, separator materials for solid polymer fuel cell use have been proposed using the methods of forming on the surface of stainless steel (SUS304) a large number of protruding shapes by press forming and forming on the end faces of the front end sides a predetermined thickness of a gold plating layer (for example, see PLT 3), depositing on a stainless steel or titanium surface a precious metal or a precious metal alloy to thereby lower the contact resistance with carbon paper (for example, see PLT 4), etc. However, these methods require that the stainless steel or titanium surface be treated to form a gold plating or other expensive precious metal layer for imparting conductivity, so had the problem of an increased cost of production of the separator.

On the other hand, various methods have been proposed for reducing the amount of use of expensive precious metals or for reducing the contact resistance between separator member surfaces and carbon paper without using a precious metal.

For example, to reduce the contact resistance between a stainless steel surface and carbon paper, the method of causing the Cr in the stainless steel to precipitate as chromium carbides in the annealing process of stainless steel and using the chromium carbides which are exposed from the passivation film surface which is formed on the stainless steel surface in order to raise the conductivity of the current received from the carbon paper (for example, see PLT 5), and the method of providing the stainless steel surface with a coating film in which SiC, $B_4C$, $TiO_2$, and other conductive compound particles are dispersed, then heating this stainless steel in a non-oxidizing atmosphere at 300 to 1100° C. to break down or consume the main ingredients of the coating film or covering the surface with a carbide-based conductive ceramic to therefore form the conductive compound particles on the stainless steel surface (for example, see PLTs 6 and 7) are known. However, these methods require the step of long heat treatment for forming conductive compounds on the stainless steel surface, so had the problem of a drop in separator productivity or increased manufacturing cost.

Further, in the method of making the Cr in the stainless steel precipitate as chromium carbides in the annealing process, in particular when the annealing time is not sufficient, a chromium-deficient layer forms around the chromium carbides in the steel, a local drop in corrosion resistance is caused in this region, and, when press forming the stainless steel to form the gas flow paths at the separator surface etc., the chromium carbides are liable to act as starting points for cracking of the stainless steel surface.

Further, the method has also been proposed of fastening a carbon layer or carbon particles with good conductivity at the stainless steel surface. For example, the method of forming gas flow paths on a metal sheet by press forming at main parts where the catalyst electrodes are located, then forming a carbon-based conductive coating layer at that surface (for example, see PLT 8), the method of dispersing and press bonding carbon powder to the stainless steel surface to improve the conductivity (for example, see PLT 9), and the method of forming at the stainless steel surface an Ni—Cr-based plating layer or Ta—, Ti—, or Ti—Ta-based plating layer in which carbon-based particles are dispersed (for example, see PLTs 10 and 11) are known. However, with the separators obtained by these methods, due to the pseudo Schottky barriers formed at the carbon side in the electron structure of the interface between the metal and carbon, a large contact resistance is formed at the interface of the stainless steel and carbon layer or carbon particles and as a result the effect of sufficiently reducing the contact resistance with the carbon paper is not obtained.

Further, the method of forming a conductive ceramic layer of one or more of TiN, TiC, CrC, TaC, $B_4C$, SiC, WC, TiN, ZrN, CrN, and HfC at the fuel electrode side feeding hydrogen-based gas at the stainless steel separator (for example, see PLT 21) has been proposed. This method forms a conductive ceramic layer by vapor deposition using a vacuum system etc. or by the dry coating method, but there are limits to the film-forming speed and a drop in yield of the coated substance is forced, so there is the problem of increased manufacturing cost.

Further, the method of affixing hard fine powder having conductivity to the surface of a base material by shot-blasting is also known. For example, a titanium or titanium alloy separator where conductive hard particles of the $M_{23}C_6$ type, $M_4C$ type, or MC type which contain a metal element (M) including at least one of chromium, iron, nickel, molybdenum, tungsten, and boron are embedded in a base material surface and dispersed and exposed (for example, see PLT 22) and a stainless steel and stainless steel separator where conductive hard particles of at least one type of carbide-based metal inclusions of the $M_{23}C_6$ type, $M_4C$ type, $M_2C$ type, and MC type and boride-based metal inclusions of the $M_2B$ type which contain a metal element (M) including at least one of chromium, molybdenum, and tungsten are embedded in a base material surface and dispersed and exposed and where a surface roughness is a centerline average roughness Ra of 0.06 to 5 μm (for example, see PLT 23) have been proposed.

Further, a method of shot blasting a separator forming a fuel cell with a solid plating material comprised of core particles which have a higher hardness' than the separator and which are coated with metal having a high corrosion resistance and low contact resistance with carbon so as to make metal coated on the solid plating material forcibly stick to the separator (for example, see PLT 24) or a method using the same technique to embed a very fine amount of a precious metal in stainless steel or titanium or titanium alloy to thereby obtain sufficiently low contact resistance even without coating the entire surface with a precious metal such as with gold plating (for example, see PLT 25) has been proposed.

These methods of affixing hard fine powder having conductivity by shot blasting etc. to the surface of a base material are advantageous methods compared with the methods of heat treatment or vacuum deposition in the point of being methods which do not lower productivity, are low in manufacturing costs, and are simple. On the other hand, with the method of mechanically driving by shot blasting etc. hard conductive particles into the surface of a metal separator base material formed into a desired shape, there is a possibility of strain being introduced into the surface layer part of the base material and the material deforming. Sometimes the flatness of the separator is reduced.

In general, a solid polymer fuel cell has a low output voltage per basic unit of about 1V, so to obtain the desired output, often a large number of fuel cells are stacked and used as a fuel cell stack. Therefore, in the method of affixing hard fine powder having conductivity to the surface of a base material by shot blasting etc., it is necessary to perform the treatment under conditions which minimize warping or distortion of the separators and give separators having a good flatness enabling stacking of fuel cells.

Further, the contact resistance between a separator and carbon paper is preferably as low as possible. For example, the method of depositing a metal having a low contact resistance with carbon of 20 $m\Omega\cdot cm^2$ or less at a contact surface pressure of 1 $kg\cdot f/cm^2$ ($9.8\times10^4$ Pa) on a separator for a fuel cell (for example, see PLT 24) etc. have been proposed.

In the above way, in the past, as the separator base material, the superior corrosion resistance stainless steel and titanium or titanium alloy or other metal materials have been used. To improve the contact resistance between the surface of these separator base materials and carbon paper, metal separators for solid polymer fuel cell use which use various methods to form conductive compound layers on the base material surface or affix conductive compound particles to them have been proposed. From the viewpoint of the contact resistance and flatness demanded from a separator for a solid polymer fuel cell or from the viewpoint of the productivity or manufacturing costs, the results cannot necessarily be said to have been sufficient.

Among these, titanium is gathering attention as a material which is even more superior in corrosion resistance to stainless steel and which has little deterioration even with long term operation. A titanium material for electrode use which comprises titanium plus a platinum group element (Pd, Pt, Ir, Ru, Rh, or Os) to inhibit a drop in conductivity and a method of production of the same (for example, see PLT 26) and a titanium material which comprises a titanium alloy base material containing a precious metal element of the platinum group elements wherein a mixed layer is formed by the precious metal element precipitated at the surface and titanium oxide, the contact resistance is low, and the contact resistance is inhibited from rising over a long period of time (for example, see PLT 27) have been proposed. However, these contain a precious metal, so the material costs become large. Further, in recycling of titanium materials, there was the problem that an added metal element was liable to invite a deterioration in the strength of the titanium, so had to be removed for recycling.

CITATION LIST

Patent Literature

PLT 1 Japanese Patent Publication (A) No. 2000-260439
PLT 2 Japanese Patent Publication (A) No. 2000-256808
PLT 3 Japanese Patent Publication (A) No. 2004-265695
PLT 4 Japanese Patent Publication (A) No. 2001-6713
PLT 5 Japanese Patent Publication (A) No. 2000-309854
PLT 6 Japanese Patent Publication (A) No. 11-260383
PLT 7 Japanese Patent Publication (A) No. 11-219713
PLT 8 Japanese Patent Publication (A) No. 2000-021419
PLT 9 Japanese Patent Publication (A) No. 11-121018
PLT 10 Japanese Patent Publication (A) No. 11-126621
PLT 11 Japanese Patent Publication (A) No. 11-126622
PLT 12 Japanese Patent Publication (A) No. 2004-107704
PLT 13 Japanese Patent Publication (A) No. 2004-156132
PLT 14 Japanese Patent Publication (A) No. 2004-273370
PLT 15 Japanese Patent Publication (A) No. 2004-306128
PLT 16 Japanese Patent Publication (A) No. 2004-124197
PLT 17 Japanese Patent Publication (A) No. 2004-269969
PLT 18 Japanese Patent Publication (A) No. 2003-223904
PLT 19 Japanese Patent Publication (A) No. 2004-2960
PLT 20 Japanese Patent Publication (A) No. 2004-232074
PLT 21 Japanese Patent Publication (A) No. 2003-123783
PLT 22 Japanese Patent Publication (A) No. 2001-357862
PLT 23 Japanese Patent Publication (A) No. 2003-193206
PLT 24 Japanese Patent Publication (A) No. 2001-250565
PLT 25 Japanese Patent Publication (A) No. 2001-6713
PLT 26 Japanese Patent Publication (A) No. 2006-190643
PLT 27 Japanese Patent Publication (A) No. 2007-59375

SUMMARY OF INVENTION

Technical Problem

The present invention has as its object the provision of a titanium material for a solid polymer fuel cell separator which is comprised of titanium having a surface layer part at which conductive compound particles are affixed, which titanium material for a solid polymer fuel cell separator is excellent in contact resistance between the fuel cell separator surface and carbon paper and in durability and furthermore contains no precious metal or rare earth element and so is low in cost and is superior in recyclability and the provision of a method of production of the same.

Solution to Problem

The present invention solves the above problem and provides a titanium material for solid polymer fuel cell separator use which has a surface layer part at which conductive compound particles are affixed and a method of production of the same. It has as its gist the following:

(1) A titanium material for solid polymer fuel cell separator use comprising a titanium base material on the surface of which is provided a film comprised of titanium compound particles and titanium oxide, the titanium material for solid polymer fuel cell separator use characterized in that the titanium compound particles are comprised of a compound of one or both of carbon or nitrogen with titanium, the film has a thickness of 100 nm to 1 μm, a surface coverage rate of the titanium base material by the film is 20% or more, and the contents of carbon and nitrogen in the film total 5 to 40 at %.

(2) A titanium material for solid polymer fuel cell separator use as set forth in (1) characterized in that the titanium oxide is comprised of an oxide of one or more oxides selected from $Ti_4O_5$, $Ti_3O_5$, $Ti_2O_3$, $TiO_2$, $TiO$, or amorphous state titanium oxide of an indeterminate ratio of composition.

(3) A titanium material for solid polymer fuel cell separator use as set forth in (1) characterized in that the titanium compound particles are comprised of one or more compounds selected from $TiN$, $Ti_2N$, $TiN_{0.96}$, $TiC$, $Ti_2C$, $TiC_{0.98}$, $Ti_2CN$, $TiC_{0.7}N_{0.3}$, $TiC_{0.62}$, $TiC_{0.59}$, $TiN_{0.12}C_{0.51}$, $TiC_{0.3}N_{0.7}$, and $TiC_{0.2}N_{0.8}$.

(4) A titanium material for solid polymer fuel cell separator use as set forth in (1) characterized in that the titanium compound particles have an average size of 50 nm to 1 μm.

(5) A titanium material for solid polymer fuel cell separator use as set forth in (1) characterized in that the contents of carbon and nitrogen in the film total 10 to 40 at %.

(6) A method of production of a titanium material for solid polymer fuel cell separator use as set forth in any one of (1) to (5), the method of production of a titanium material for solid polymer fuel cell separator use characterized by cold rolling titanium, causing carbon which is contained in a cold rolling oil to deposit on the titanium surface, then heating in a dew point −40° C. or less, 1 atmosphere gas stream of argon gas or nitrogen gas or mixed gas of argon and nitrogen at 700 to 950° C. for 30 to 120 seconds, then immersing in a mass % concentration 20 to 60%, temperature 50 to 95° C. nitric acid aqueous solution for 5 to 180 minutes (300 to 10800 seconds), then rinsing with water.

(7) A method of production of a titanium material for solid polymer fuel cell separator use as set forth in any one of (1) to (5), the method of production of a titanium material for solid polymer fuel cell separator use characterized by cold rolling titanium, causing carbon which is contained in a cold rolling oil to deposit on the titanium surface, then heating in a dew point −40° C. or less, 1 atmosphere gas stream of argon gas or nitrogen gas or mixed gas of argon and nitrogen at 700 to 950° C. for 30 to 120 seconds, then immersing in a pH 0.5 to pH2, temperature 70 to 95° C. sulfuric acid aqueous solution for 5 to 180 minutes (300 to 10800 seconds), then rinsing with water.

(8) A method of production of a titanium material for solid polymer fuel cell separator use as set forth in any one of (1) to (5), the method of production of a titanium material for solid polymer fuel cell separator use characterized by cold rolling titanium, causing carbon which is contained in a cold rolling oil to deposit on the titanium surface, then heating in a dew point −40° C. or less, 1 atmosphere gas stream of argon gas or nitrogen gas or mixed gas of argon and nitrogen at 700 to 950° C. for 30 to 120 seconds, then immersing in a mass % concentration 1 to 10%, temperature 20 to 50° C. hydrochloric acid aqueous solution for 5 to 180 minutes (300 to 10800 seconds), then rinsing with water.

(9) A method of production of a titanium material for solid polymer fuel cell separator use as set forth in any one of (1) to (5),
the method of production of a titanium material for solid polymer fuel cell separator use characterized by cold rolling titanium, causing carbon which is contained in a cold rolling oil to deposit on the titanium surface, then heating in a dew point −40° C. or less, 1 atmosphere gas stream of argon gas or nitrogen gas or mixed gas of argon and nitrogen at 700 to 950° C. for 30 to 120 seconds, then immersing in temperature 20 to 80° C. aqua regia for 5 to 180 minutes (300 to 10800 seconds), then rinsing with water.

(10) A method of production of a titanium material for solid polymer fuel cell separator use as set forth in (6), characterized in that the gas stream is used preheated to 700 to 950° C.

(11) A method of production of a titanium material for solid polymer fuel cell separator use as set forth in (7), characterized in that the gas stream is used preheated to 700 to 950° C.

(12) A method of production of a titanium material for solid polymer fuel cell separator use as set forth in (8), characterized in that the gas stream is used preheated to 700 to 950° C.

(13) A method of production of a titanium material for solid polymer fuel cell separator use as set forth in (9), characterized in that the gas stream is used preheated to 700 to 950° C.

(14) A method of production of a titanium material for solid polymer fuel cell separator use as set forth in (6), characterized in that the amount of carbon which is deposited on the titanium surface after cold rolling is 10 to 200 mg/m$^2$.

(15) A method of production of a titanium material for solid polymer fuel cell separator use as set forth in (7), characterized in that the amount of carbon which is deposited on the titanium surface after cold rolling is 10 to 200 mg/m$^2$.

(16) A method of production of a titanium material for solid polymer fuel cell separator use as set forth in (8), characterized in that the amount of carbon which is deposited on the titanium surface after cold rolling is 10 to 200 mg/m$^2$.

(17) A method of production of a titanium material for solid polymer fuel cell separator use as set forth in (9), characterized in that the amount of carbon which is deposited on the titanium surface after cold rolling is 10 to 200 mg/m$^2$.

(18) A method of production of a titanium material for solid polymer fuel cell separator use as set forth in (6), characterized in that the amount of carbon which is deposited on the titanium surface after cold rolling is 50 to 200 mg/m$^2$.

(19) A method of production of a titanium material for solid polymer fuel cell separator use as set forth in (7), characterized in that the amount of carbon which is deposited on the titanium surface after cold rolling is 50 to 200 mg/m$^2$.

(20) A method of production of a titanium material for solid polymer fuel cell separator use as set forth in (8), characterized in that the amount of carbon which is deposited on the titanium surface after cold rolling is 50 to 200 mg/m$^2$.

(21) A method of production of a titanium material for solid polymer fuel cell separator use as set forth in (9), characterized in that the amount of carbon which is deposited on the titanium surface after cold rolling is 50 to 200 mg/m$^2$.

(22) A method of production of a titanium material for solid polymer fuel cell separator use as set forth in any one of (1) to (5),
the method of production of a titanium material for solid polymer fuel cell separator use characterized by driving into the surface of the titanium by the shot blasting method by a blasting pressure of 0.4 MPa or less and a blasting rate of 5 to 120 g/cm$^2$ titanium compound particles comprised of a compound of one or both of carbon or nitrogen and titanium, then immersing in a mass % concentration 20 to 60%, temperature 50 to 95° C. nitric acid aqueous solution for 5 to 180 minutes (300 to 10800 seconds), then rinsing with water.

(23) A method of production of a titanium material for solid polymer fuel cell separator use as set forth in any one of (1) to (5),
the method of production of a titanium material for solid polymer fuel cell separator use characterized by driving into the surface of the titanium by the shot blasting method by a blasting pressure of 0.4 MPa or less and a blasting rate of 5 to 120 g/cm$^2$ titanium compound particles comprised of a compound of one or both of carbon or nitrogen and titanium, then immersing in a pH0.5 to pH2, temperature 70 to 95° C. sulfuric acid aqueous solution for 5 to 180 minutes (300 to 10800 seconds), then rinsing with water.

(24) A method of production of a titanium material for solid polymer fuel cell separator use as set forth in any one of (1) to (5),
the method of production of a titanium material for solid polymer fuel cell separator use characterized by driving into the surface of the titanium by the shot blasting method by a blasting pressure of 0.4 MPa or less and a blasting rate of 5 to 120 g/cm$^2$ titanium compound particles comprised of a compound of one or both of carbon or nitrogen and titanium, then immersing in a mass % concentration 1 to 10%, temperature 20 to 50° C. hydrochloric acid aqueous solution for 5 to 180 minutes (300 to 10800 seconds), then rinsing with water.

(25) A method of production of a titanium material for solid polymer fuel cell separator use as set forth in any one of (1) to (5),
the method of production of a titanium material for solid polymer fuel cell separator use characterized by driving into the surface of the titanium by the shot blasting method by a blasting pressure of 0.4 MPa or less and a blasting rate of 5 to 120 g/cm$^2$ titanium compound particles comprised of a compound of one or both of carbon or nitrogen and titanium, then immersing in temperature 20 to 80° C. aqua regia for 5 to 180 minutes (300 to 10800 seconds), then rinsing with water.

(26) A method of production of a titanium material for solid polymer fuel cell separator use as set forth in (13), characterized in that the titanium compound particles which are driven in by the shot blasting method are one or more compounds selected from TiN, Ti$_2$N, TiC, and Ti$_2$C.

(27) A method of production of a titanium material for solid polymer fuel cell separator use as set forth in (14), characterized in that the titanium compound particles which are driven in by the shot blasting method are one or more compounds selected from TiN, Ti$_2$N, TiC, and Ti$_2$C.

(28) A method of production of a titanium material for solid polymer fuel cell separator use as set forth in (15), characterized in that the titanium compound particles which are driven in by the shot blasting method are one or more compounds selected from TiN, Ti$_2$N, TiC, and Ti$_2$C.

(29) A method of production of a titanium material for solid polymer fuel cell separator use as set forth in (16), characterized in that the titanium compound particles which are driven in by the shot blasting method are one or more compounds selected from TiN, Ti$_2$N, TiC, and Ti$_2$C.

Advantageous Effects of Invention

According to the present invention, the contact resistance with the carbon paper is low, the durability is excellent, and no precious metal or rare earth element is included, so it is possible to obtain a titanium material for solid polymer fuel cell separator use which is low in cost and excellent in recyclability.

DESCRIPTION OF EMBODIMENTS

The present invention will be explained in detail below.

Figure 1:
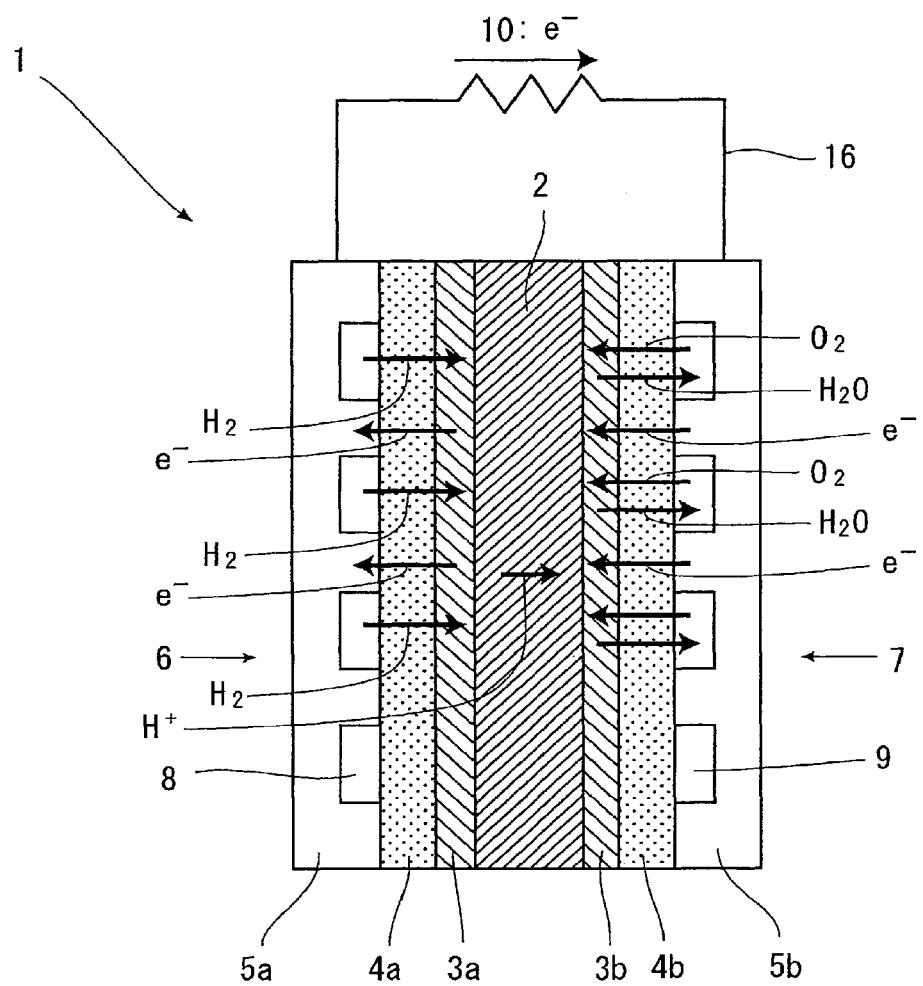
FIG. 1 is a view for explaining the configuration of a solid polymer fuel cell.

As explained above, the component member separator 5 of the solid polymer fuel cell 1 shown in FIG. 1 is required to have, as a basic characteristic, conductivity, in particular a small contact resistance between the separator 5 surface and the carbon paper 4 when receiving current from the carbon paper 4.

Further, the solid polymer fuel cell 1 has a solid polymer film 2 made of an electrolyte exhibiting a strong acidity. Due to the reaction proceeding at a temperature of about 150° C., it generates water. For this reason, the separator 5 is required to have, as material properties, a corrosion resistance and durability sufficient to withstand these temperatures and the corrosive environment in an acidic aqueous solution In view of the above, the present invention uses titanium as the base material of the titanium material for solid polymer fuel cell separator use as it has a good corrosion resistance at the above temperature and in the corrosive environment of an acidic aqueous solution.

Figure 2:
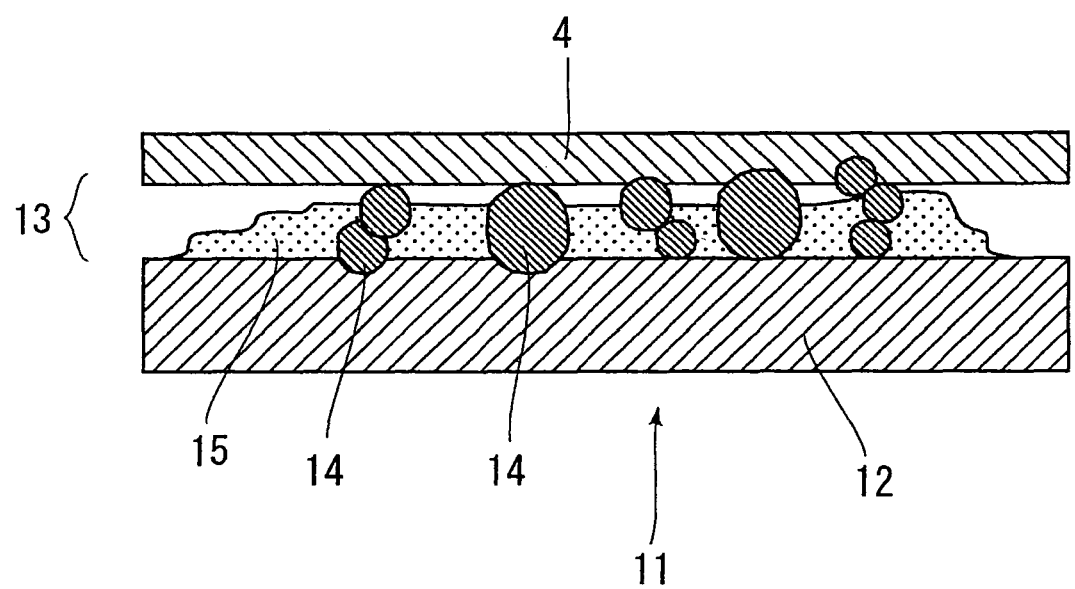
FIG. 2 is a view for explaining the configuration of a titanium material for a solid fuel cell separator of the present invention.

The basic concept of the present invention will be explained using FIG. 2. The titanium material 11 for a solid polymer fuel cell separator of the present invention is comprised of a titanium base material 12 and a film 13 of the surface layer part. Further, the film 13 is comprised of titanium compound particles 14 which are made from a compound of one or both of carbon or nitrogen and titanium and have conductivity and titanium oxide 15.

In the solid polymer fuel cell 1, the carbon paper 4 which is contiguous with the separator 5 contacts the film 13 on the separator base material 12. The film 13 contains the conductive titanium compound particles 14, so by the titanium compound particles 14 contacting both the titanium base material 12 and the carbon paper 4 or two or more titanium compound particles connecting in the film and forming communicating paths between the titanium base material 12 and the carbon paper 4, the contact resistance of the titanium base material 12 and the carbon paper 4 can be made 10 m$\Omega$·cm$^2$ or less. Further, by covering the conductive titanium compound particles 14 by titanium oxide 15, it is possible to prevent the titanium compound particles from corroding at the above temperature in the corrosive environment of the acidic aqueous solution and enable a 10 m$\Omega$·cm$^2$ or less contact resistance value to be maintained even over long term operation. This is the basic idea of the present invention.

The fuel cell separator of the present invention uses titanium as the base material and has at its surface a film which is comprised of titanium compound particles made from a compound of one or both of carbon or nitrogen and titanium and of titanium oxide, which has a thickness of 100 nm to 1 μm, preferably a thickness of 500 nm to 1 μm, and which has a surface coverage rate of 20% or more.

As the titanium base material, industrial-use pure titanium is preferably used.

The reason for making the thickness of the film 100 nm or more is that if the thickness of the film is less than 100 nm, durability under a corrosive environment cannot be sufficiently obtained. If the thickness of the film is 500 nm or more, even with long time power generation, the contact resistance between the separator and the carbon paper will not deteriorate, so the thickness of the film is preferably 500 nm or more.

To ensure that the contact resistance between the separator and the carbon paper become 10 m$\Omega$·cm$^2$ or less, the titanium compound particles having conductivity have to contact both the separator base material and the carbon paper or two or more titanium compound particles in the film have to connect and form communicating paths between the titanium base material 11 and the carbon paper 4. However, if the thickness of the film exceeds 1 μm, the titanium compound particles will only contact one of the separator base material and carbon paper and the contact resistance will exceed 10 m$\Omega$·cm$^2$, so the thickness of the film is made 1 μm or less.

The coverage rate of the base material surface by the film is made 20% or more so as to make the contact resistance of the separator and the carbon paper 10 m$\Omega$·cm$^2$ or less. The contact resistance between industrial-use pure titanium and carbon paper is usually 50 m$\Omega$·cm$^2$ or so or more. If no conductive film is interposed, it is difficult to make the contact resistance 10 m$\Omega$·cm$^2$ or less. If the film coverage rate is smaller than 20%, the contact resistance exceeds 10 m$\Omega$·cm$^2$, so the surface coverage rate of the film is made 20% or more.

Part of the ingredients of the film is made titanium oxide because titanium oxide is stable in the usage environment of fuel cells, so there is an effect of improvement of the durability. Further, titanium oxide does not elute metal ions, so there is no deterioration of the solid electrolyte due to metal ions. As the titanium oxide, preferably Ti$_4$O$_5$, Ti$_3$O$_5$, Ti$_2$O$_3$, TiO$_2$, TiO, or amorphous titanium oxide of an indeterminate ratio of composition is used.

To make the contact resistance 10 m$\Omega$·cm$^2$ or less, in the present invention, the film contains, in addition to titanium oxide, titanium compound particles made of a compound of one or both of carbon or nitrogen and titanium. The reason is that a titanium compound of one or both of carbon or nitrogen and titanium has excellent conductivity, so in addition to the effect of reduction of the contact resistance, the cost is inexpensive and the result nontoxic in recycling of the titanium.

That is, when recycling a titanium material for use, the metal elements which form intermetallic compounds with titanium and greatly detract from the material properties have to be removed. For this reason, if using a conductive compound such as one containing a metal element other than titanium, the recyclability becomes impaired. Nitrides and carbides of titanium have conductivity, but do not impair the recyclability of the titanium material.

The separator of the present invention has a film at the surface. the film contains titanium oxide and titanium compound particles made from a compound of one or both of carbon or nitrogen and titanium. The carbon and nitrogen in the film may be present as the titanium compound particles.

Therefore, the content of the titanium compound in the film can be evaluated by the total of the contents of carbon and nitrogen in the film assayed by glow discharge spectrometry (GDS). In the present invention, the total value of the contents of carbon and nitrogen in the film is made 5 to 40 at %. The reason is that if the total value of the contents of carbon and nitrogen in the film is 5 to 40 at %, the titanium compound particles in the film contact both the titanium base material and carbon paper or two or more titanium compound particles connect to form communicating paths between the titanium base material and the carbon paper, while if less than 5 at %, communicating paths are not formed, so the effect of reducing the contact resistance cannot be expected. Further, if the total value of the contents of carbon and nitrogen in the film exceeds 40 at %, the protection afforded by the titanium oxide is not sufficient and with long term operation, the titanium compound particles become worn and the contact resistance rises. Further, if the total value of the contents of carbon and nitrogen in the film is made 10 at % or more, even with long term power generation, the deterioration in the contact resistance between the carbon paper and separator will only be slight, so the total value of the contents of carbon and nitrogen in the film is preferably made 10 to 40 at %.

In the present invention, preferably, the titanium compound is a titanium compound of one or both of the carbon or nitrogen and titanium in the film. One or more compounds selected from TiN, $Ti_2N$, $TiN_{0.96}$, TiC, $Ti_2C$, $TiC_{0.98}$, $Ti_2CN$, $TiC_{0.7}N_{0.3}$, $TiC_{0.62}$, $TiC_{0.59}$, $TiN_{0.12}C_{0.51}$, $TiC_{0.3}N_{0.7}$, and $TiC_{0.2}N_{0.8}$ is used.

In the present invention, the titanium compound is preferably particle shaped with an average diameter of 50 nm to 1 μm. The average diameter is made 50 nm or more since if less than 50 nm, it will become harder for the titanium compound particles to contact both the separator base material and the carbon paper or for two or more titanium compound particles in the film to connect and form communicating paths between the titanium base material and the carbon paper, so sometimes the effect of reduction of the contact resistance will not be sufficient. Further, if the average diameter of the compound particles exceeds 1 μm, the protection afforded by the titanium oxide will not be sufficient and with long term operation, the titanium compound particles will become worn and the contact resistance will easily rise, so the average diameter of the compound particles is preferably made 1 μm or less. By making the contents of carbon and nitrogen in the film total 5 to 40 at %, more preferably 10 to 40 at %, it is possible to make the titanium compound a particle shape of an average diameter of 50 nm to 1 μm.

Next, the method of production of the fuel cell separator of the present invention will be explained.

(a) The titanium is cold rolled, cold rolling oil is made to deposit on the surface of the titanium base material, and a metal-use degreasing detergent is used for degreasing by immersion at ordinary temperature for 10 minutes to 120 minutes. The cold rolling oil contains carbon, so carbon is deposited on the titanium base material surface. The immersion time is used to adjust the carbon deposition amount to 10 to 200 mg/m². The carbon deposition amount may be assayed by GDS.

The reason for making the amount of deposition of carbon 10 to 200 mg/m² is that if the amount of deposition of carbon is less than 10 mg/m², an amount of formation of the titanium compound particles sufficient for reducing the contact resistance cannot be obtained. Further, if the amount of deposition of carbon exceeds 200 mg/m², the titanium compound particles are excessively formed, the corrosion resistance of the film falls, and the contact resistances after the corrosion resistance test and after the power generation test become high. More preferably the amount of deposition of carbon is made 50 to 200 mg/m². The reason is that if the amount of carbon is 50 mg/m² or less, with long term power generation, the contact resistance between the separator and carbon paper deteriorates.

Next, the titanium base material is annealed in a dew point −40° C. or less stream of argon or nitrogen or mixed gas of argon and nitrogen. The reason for making the dew point of the atmosphere −40° C. or less is that if annealing in an atmosphere with a dew point which exceeds −40° C., the entire surface of the titanium base material surface is formed with a film of titanium oxide and the contact resistance becomes higher. Even if forming titanium compound particles on top of that, conductivity between the titanium base material and the carbon paper can no longer be obtained. The titanium oxide forming part of the film of the present invention, as explained later, is formed after the end of the annealing by immersing the titanium base material in an acid aqueous solution.

The method for making the dew point of the atmosphere −40° C. or less will be explained next.

The argon and nitrogen are used in purities of 99.999% or more. The moisture in the atmosphere which is adsorbed at the walls of the annealing furnace causes the dew point inside the furnace to rise, so before charging the titanium base material into the annealing furnace, argon or nitrogen is run into the furnace and the temperature of the furnace raised to 100° C. or more to make the furnace walls sufficiently dry, then the annealing is performed. During the annealing, 1 atmosphere of gas is continuously run through the furnace. The reason is that in the degreasing treatment after the cold rolling, the moisture which is adsorbed at the titanium base material surface causes the dew point inside the furnace to rise to a value exceeding −40° C. The flow rate of the gas is not particularly limited, but should be adjusted so that the dew point inside the furnace becomes −40° C. or less. If excessively run, the cost becomes high.

Further, the gas is preferably introduced into the annealing furnace after being passed through a preheating chamber and heated to the annealing temperature, that is, 700 to 950° C. If introducing the gas into the furnace as room temperature, the titanium base material will be cooled by the room temperature gas, so it will be difficult to control the temperature of the titanium base material to the desired value.

If using a mixed gas of argon and nitrogen, the mixing ratio is not particularly defined, but the nitrogen should be made 1 vol % or more, more preferably the nitrogen should be 40 to 60 vol %.

By annealing in argon, the carbon which is deposited at the titanium base material surface and the titanium react to form TiC, $Ti_2C$, $TiC_{0.98}$, $TiC_{0.62}$, and $TiC_{0.59}$ titanium compounds. Further, the nitrogen which is deposited on the titanium base material surface during the cold rolling or the fine amount of nitrogen which is included in the annealing atmosphere may be reacted with to form $Ti_2CN$, $TiC_{0.7}N_{0.3}$, $TiN_{0.12}C_{0.51}$, $TiC_{0.3}N_{0.7}$, $TiC_{0.2}N_{0.8}$, and other titanium compounds containing both carbon and nitrogen.

Further, by annealing in nitrogen, TiN, $Ti_2N$, and $TiN_{0.96}$ titanium compounds are formed. Further, due to the reaction with the carbon which is deposited on the titanium surface during the cold rolling, TiC, $Ti_2C$, $TiC_{0.98}$, $Ti_2CN$, $Ti_{0.7}N_{0.3}$, $TiC_{0.62}$, $TiC_{0.59}$, $TiN_{0.12}C_{0.51}$, $TiC_{0.3}N_{0.7}$, $TiC_{0.2}N_{0.8}$, and other titanium compounds containing both carbon and nitrogen may be formed.

Further, by annealing in a mixed gas atmosphere of nitrogen and argon, $Ti_2CN$, $TiC_{0.7}N_{0.3}$, $TiC_{0.62}$, $TiC_{0.59}$, $TiN_{0.12}C_{0.51}$, $TiC_{0.3}N_{0.7}$, $TiC_{0.2}N_{0.8}$, and other titanium compounds containing both nitrogen and carbon are formed.

The heating temperature at the annealing is made 700 to 950° C. The reason is that if the heating temperature is less than 700° C., a sufficient amount of the titanium compound for reducing the contact resistance is not obtained. Further, if the heating temperature exceeds 950° C., the titanium compound is excessively formed, the corrosion resistance of the film falls, and the contact resistance after the corrosion resistance test or after the power generation test becomes high.

Further, the heating time of the annealing is made 30 to 120 seconds. The reason is that if the heating time is less than 30 seconds, a sufficient amount of the titanium compound for reducing the contact resistance is not obtained, while if the heating time exceeds 120 seconds, the titanium compound is excessively formed, the corrosion resistance of the film falls, and the contact resistances after the corrosion resistance test and after the power generation test become high.

Further, (b) the fuel cell separator of the present invention may be produced by the method of affixing compounds of titanium with nitrogen or carbon or both on the surface of the titanium base material by shot blasting. The shot blasting and conditions therefore in the method of production of the present invention are as follows:

First, superhard core particles comprised of a material with a higher hardness than the separator base material, for example, tungsten carbide, are covered on their surface by titanium compound particles meant to be affixed to the separator base material to thereby prepare blasting particles.

The method of covering superhard core particles surface with titanium compound particles is to mix the titanium compound particles in advance with a coating solution to prepare a suspension and coat the suspension on the surface of the superhard core particles. The type of the coating solution does not have to be particularly limited. For example, polyvinyl alcohol or a methacrylic acid copolymer etc. is used. Further, the ratio of the titanium compound particles in the suspension at that time is preferably 10 to 20 mass %.

The method of coating the suspension on the surface of the superhard core particles is, for example, to use a centrifugal flow type stirring device to stir the superhard core particles while spraying the suspension on the surface of the particles and thereby form a coating layer containing the conductive compound particles on the particle surface.

The blasting particles comprised of the conductive compound particles which were obtained by the above method (titanium compound particles) are blasted against the base material surface by shot blasting by a stream of dry air or a stream of inert gas, a blasting pressure of 0.4 MPa or less, and a blasting rate of 5 to 120 g per base material 1 cm$^2$. In the shot blasting of the base material surface, the blasting cores strike the separator surface and the blasting particles are driven into the base material surface down to predetermined depths. Along with the impact, the titanium compound particles covered on the blasting particle surfaces are peeled off and affixed at the regions a predetermined depth from the titanium base material surface.

The titanium compound particles are nitrides and carbides or carbonitrides having conductivity. Specifically, one or more compounds of TiN, Ti$_2$N, TiN$_{0.96}$, TiC, Ti$_2$C, TiC$_{0.98}$, Ti$_2$CN, TiC$_{0.7}$N$_{0.3}$, TiC$_{0.62}$, TiC$_{0.59}$, TiN$_{0.12}$C$_{0.51}$, TiC$_{0.3}$N$_{0.7}$, and TiC$_{0.2}$N$_{0.8}$ are preferable. Further, one or more metal compounds of the industrially easily available TiN, Ti$_2$N, TiC, and Ti$_2$C are preferable.

Further, the lower limit of the average particle size of the titanium compound particles forming the blasting particles is made 0.01 μm since if the average particle size of the titanium compound particles is less than 0.01 μm, since the later explained pickling causes the titanium compound particles to be reduced in size, the effect of reduction of the contact resistance of the separator surface is not sufficiently obtained and the low contact resistance targeted for a separator for a solid polymer fuel cell cannot be obtained. On the other hand, if the average particle size of the titanium compound particles exceeds 20 μm, when using blasting particles comprised of conductive titanium compound particles covering the surfaces of superhard core particles to shot blast the surface layer part of the base material, the titanium compound particles will have difficulty being fixed to the surface layer part of the titanium base material or even if being affixed, will easily peel off, so the amount fixed there will become smaller and as a result the density of titanium compound particles affixed at the surface layer part will fall and a low contact resistance between the separator and the carbon paper will no longer be obtained. Therefore, the upper limit of the average particle size of the titanium compound particles should be 20 μm or less.

Further, the particle size of the superhard core particles forming the blasting particles does not have to be limited for the reason of reduction of the contact resistance since the superhard core particles do not have any effect on the contact resistance of the obtained separator surface. However, if the average particle size of the superhard core particles exceeds 200 μm, even if adjusting the blasting pressure in the shot blasting, it becomes difficult to obtain a flat separator shape and therefore stably securing a flatness enabling the stackability demanded from a separator for solid polymer fuel cell use becomes difficult. Therefore, the average particle size of the superhard core particles is preferably made 200 μm or less. More preferably, the average particle size of the superhard core particles should be made 100 μm or less.

As explained above, in shot blasting, the titanium compound particles which are covered on the surfaces of the superhard core particles forming the blasting particles are driven down to predetermined depths from the surface by the superhard core particles striking the titanium base material surface. Due to the impact at that time, they peel off from the surfaces of the superhard core particles and are affixed at regions a predetermined depth from the titanium base material surface.

Further, the blasting pressure in the shot blasting (impact energy) is made 0.4 MPa or less because it is necessary for maintaining a good flatness of the separator. That is, if the blasting pressure exceeds 0.4 MPa, the amount of strain at the surface layer part of the titanium base material increases, the flatness of the separator shape deteriorates, and stably securing a good flatness becomes difficult. Therefore, the upper limit of the blasting pressure is preferably made 0.4 MPa or less. From the viewpoint of improvement of the flatness of the separator shape, more preferably the blasting pressure is limited to 0.3 MPa or less. Note that the lower limit of the blasting pressure of the blasting particles in the shot blasting is not particularly defined, but if considering the adjustment of shape of the separator in the shot blasting and other work, the pressure is preferably 0.01 MPa or more.

Next, (c), after forming a titanium compound at the titanium base material surface by the annealing of the above (a) or forming a titanium compound particle-containing layer at the titanium base material surface by the shot blasting of the above (b), as explained in detail below, the material is immersed in one type of chemical of a nitric acid aqueous solution, sulfuric acid aqueous solution, hydrochloric acid aqueous solution, and aqua regia, then rinsed with water.

(a) In the case of an annealed material, the annealed surface of the titanium base material is formed with a film-shaped or particle-shaped titanium compound. By immersion in a chemical in that state, part of the titanium compound dissolves, the particle-shaped parts become reduced in size and the film-shaped parts are cleaved and form particle shapes and titanium oxide is formed at the surface of the titanium base material. The film comprised of the thus formed titanium compound particles and titanium oxide becomes the film of the present invention.

(b) In the case of a shot blasted material, the shot blasted surface of the titanium base material is formed with a particle-shaped titanium compound. By immersion in a chemical in that state, the titanium compound particles become reduced in size and titanium oxide is formed at the surface of the titanium base material. The film comprised of the thus formed titanium compound particles and titanium oxide becomes the film of the present invention.

Below, each type of treatment solution will be explained in detail.

(C1) After the formation of the titanium compound-containing layer at the titanium base material surface by the annealing or shot blasting method, the material is immersed in a 20 to 60 mass % nitric acid aqueous solution at a 50 to 95° C. temperature for 5 to 180 minutes, then rinsed and dried.

In the process of immersion in the nitric acid aqueous solution, the following reaction occurs. That is, part of the titanium compound or titanium compound particles which is formed by the annealing process or shot blasting process dissolves and becomes hydrated ions of titanium which are eluted into the nitric acid aqueous solution. The titanium compound becomes particle shaped and then a dehydration-condensation reaction causes one or more types of titanium oxide of $Ti_4O_5$, $Ti_3O_5$, $Ti_2O_3$, $TiO_2$, $TiO$, or amorphous titanium oxide of an indeterminate ratio of composition to precipitate in a mixed state at the surface of the titanium compound particles and further to form a film on the surface of the titanium base material by the titanium compound particles and titanium oxide. Such a film becomes a protective film in the fuel cell operating environment. In the process, the titanium compound which is formed by the cold rolling and the annealing or the titanium compound particles which are formed by the shot blasting are reduced in size and become diameters of 50 nm to 1 μm and the contents of carbon and nitrogen in the film total 5 to 40 at %. The titanium compound particles contact both the titanium base material and the carbon paper or two or more titanium compound particles connect inside the film and form communicating paths between the titanium base material and carbon paper to thereby reduce the contact resistance between the titanium base material and the carbon paper.

The inventors engaged in repeated studies on the relationship between the contact resistance of a titanium base material treated by immersion in an acid and carbon paper and the content of the titanium compound particles in the film and discovered that if the content of the titanium compound particles in the film is, by total of the contents of carbon and nitrogen, 5 at % or more, the contact resistance value becomes small.

The reason is believed to be the same as the reason why, for example, a conductive paint exhibits conductivity. That is, if adding conductive particles by a certain content or more to a conductive paint, the conductive particles will connect and form clusters whereby communicating paths will be formed and thereby conductivity exhibited.

In the titanium base material of the present invention as well, part of the titanium compound particles dissolve in the acid for the immersion treatment to become hydrated ions of titanium, then the hydrated ions of titanium are engaged in a dehydration-condensation reaction and become titanium oxide which precipitates to form a film. If the content of the titanium compounds in the film is, by total of carbon and nitrogen, 5 at % or more, the clusters of the titanium compound particles connected together will be formed or large particle size titanium compound particles will directly contact both the carbon paper and the separator thereby enabling the formation of communicating paths in the insulator titanium oxide.

The reason for limiting the concentration of the nitric acid aqueous solution to 2 to 60 mass % will be explained below.

If the concentration of the nitric acid aqueous solution is less than 20 mass %, there is little elution of titanium ions from the titanium compound particles, so the size of the titanium compound particles is not reduced and the diameter exceeds 1 μm. Further, there is little precipitation of titanium oxide which is formed by the dehydration-condensation reaction, so the contents of the carbon and nitrogen in the film total over 40 at %. For this reason, corrosion resistance of the film is not obtained and the contact resistances after the corrosion resistance test and after the power generation test become high. If the concentration of nitric acid is over 60 mass %, the elution of titanium ions from the titanium compound particles becomes excessive, so the titanium compound particles are reduced in size and become a diameter of less than 50 nm. Further, the precipitation of titanium oxide which is formed by the dehydration-condensation reaction is excessive, so the content of carbon and nitrogen in the film becomes a total of less than 5 at %. Therefore, the paths formed by the titanium compound particles connecting the titanium base material and the carbon paper are no longer formed and the contact resistance exceeds 10 mΩ·cm².

The reason for limiting the temperature of the nitric acid aqueous solution to 50 to 95° C. will be explained below.

If the solution temperature of the nitric acid aqueous solution is less than 50° C., there is little elution of titanium ions from the titanium compound particles, so the titanium compound particles are not reduced in size and the diameter exceeds 1 μm. Further, there is little precipitation of titanium oxide which is formed by the dehydration-condensation reaction, so the contents of the carbon and nitrogen in the film total over 40 at %. For this reason, corrosion resistance of the film is not obtained and the contact resistances after the corrosion resistance test and after the power generation test become high. If the solution temperature is over 95° C., the elution of titanium ions from the titanium compound particles becomes excessive, so the titanium compound particles are reduced in size and become a diameter of less than 50 nm. Further, the precipitation of titanium oxide which is formed by the dehydration-condensation reaction is excessive, so the content of the titanium compound in the film, converted to at % of carbon and nitrogen in the film, becomes a total of less than 5 at %. Therefore, the paths formed by the titanium compound particles connecting the titanium base material and the carbon paper are no longer formed and the contact resistance exceeds 10 mΩ·cm².

The reason for limiting the time for immersion in the nitric acid aqueous solution 5 to 180 minutes (300 to 10800 seconds) will be explained next.

With an immersion time of less than 5 minutes (300 seconds), there is little elution of titanium ions from the titanium compound particles, so the size of the titanium compound particles is not reduced and the diameter exceeds 1 μm. Further, there is little precipitation of titanium oxide formed by the dehydration-condensation reaction, so the contents of carbon and nitrogen in the film total over 40 at %. Therefore, corrosion resistance of the film is not obtained and the contact resistances after the corrosion resistance test and after the power generation test become higher. If the immersion time exceeds 180 minutes (10800 seconds), the elution of titanium ions from the titanium compound particles becomes excessive, so the titanium compound is reduced in size and becomes a diameter of less than 50 nm. Further, the precipitation of titanium oxide which is formed by the dehydration-condensation reaction is excessive, so the contents of carbon and nitrogen in the film total less than 5 at %. Therefore, the paths formed by the titanium compound particles connecting the titanium base material and the carbon paper are no longer formed and the contact resistance exceeds 10 mΩ·cm².

(C2) In the pickling after the formation of the titanium compound-containing layer at the titanium base material surface by the annealing or shot blasting method, a sulfuric acid aqueous solution may also be used.

The material is immersed in a pH0.5 to pH2 sulfuric acid aqueous solution at 70 to 95° C. temperature for 5 to 180 minutes (300 to 10800 seconds), then rinsed and dried. In the process of immersion in the sulfuric acid aqueous solution, the following reaction occurs. That is, part of the titanium compound or titanium compound particles which is formed by the annealing process or shot blasting process dissolves and becomes hydrated ions of titanium which are eluted into the sulfuric acid aqueous solution. The titanium compound becomes particle shaped and then a dehydration-condensation reaction causes one or more types of titanium oxide of $Ti_4O_5$, $Ti_3O_5$, $Ti_2O_3$, $TiO_2$, $TiO$, or amorphous titanium oxide of an indeterminate ratio of composition to precipitate in a mixed state at the surface, of the titanium compound particles and further to form a film on the surface of the titanium base material by the titanium compound particles and titanium oxide. Such a film becomes a protective film in the fuel cell operating environment. In the process, the titanium compound which is formed by the cold rolling and the annealing or the titanium compound particles which are formed by the shot blasting are reduced in size and become a diameter of 50 nm to 1 μm and the content of the titanium compound in the film, converted to at % of carbon and nitrogen in the film, becomes a total of 5 to 40 at %.

The reason for limiting the concentration of the sulfuric acid aqueous solution to pH0.5 to pH2 will be explained below.

If the concentration of the sulfuric acid aqueous solution is less than pH0.5, there is little elution of titanium ions from the titanium compound particles, so the size of the titanium compound particles is not reduced and the diameters exceed 1 μm. Further, there is little precipitation of titanium oxide which is formed by the dehydration-condensation reaction, so the contents of the carbon and nitrogen in the film total over 40 at %. For this reason, corrosion resistance of the film is not obtained and the contact resistances after the corrosion resistance test and after the power generation test become high. If the concentration of sulfuric acid is over pH2, the elution of titanium ions from the titanium compound particles becomes excessive, so the titanium compound particles are reduced in size and become a diameter of less than 50 nm. Further, the precipitation of titanium oxide which is formed by the dehydration-condensation reaction is excessive, so the content of carbon and nitrogen in the film becomes a total of less than 5 at %. Therefore, the paths formed by the titanium compound particles connecting the titanium base material and the carbon paper are no longer formed and the contact resistance exceeds 10 mΩ·cm².

The reason for limiting the temperature of the sulfuric acid aqueous solution to 70 to 95° C. will be explained below.

If the solution temperature of the sulfuric acid aqueous solution is less than 70° C., there is little elution of titanium ions from the titanium compound particles, so the titanium compound particles are not reduced in size and the diameter exceeds 1 μm. Further, there is little precipitation of titanium oxide which is formed by the dehydration-condensation reaction, so the contents of the carbon and nitrogen in the film total over 40 at %. For this reason, corrosion resistance of the film is not obtained and the contact resistances after the corrosion resistance test and after the power generation test become high. If the solution temperature is over 95° C., the elution of titanium ions from the titanium compound particles becomes excessive, so the titanium compound particles are reduced in size and become a diameter of less than 50 nm. Further, the precipitation of titanium oxide which is formed by the dehydration-condensation reaction is excessive, so the contents of carbon and nitrogen in the film total less than 5%. Therefore, the paths formed by the titanium compound particles connecting the titanium base material and the carbon paper are no longer formed and the contact resistance exceeds 10 mΩ·cm².

The reason for limiting the time for immersion in the sulfuric acid aqueous solution 5 to 180 minutes (300 to 10800 seconds) will be explained next.

With an immersion time of less than 5 minutes (300 seconds), there is little elution of titanium ions from the titanium compound particles, so the size of the titanium compound particles is not reduced and the diameter exceeds 1 μm. Further, there is little precipitation of titanium oxide formed by the dehydration-condensation reaction, so the contents of carbon and nitrogen in the film total over 40 at %. Therefore, corrosion resistance of the film is not obtained and the contact resistance after the corrosion resistance test and after the power generation test becomes higher. If the immersion time exceeds 180 minutes (10800 seconds), the elution of titanium ions from the titanium compound particles becomes excessive, so the titanium compound is reduced in size and becomes a diameter of less than 50 nm. Further, the precipitation of titanium oxide which is formed by the dehydration-condensation reaction is excessive, so the contents of carbon and nitrogen in the film total less than 5 at %. Therefore, the paths formed by the titanium compound particles connecting the titanium base material and the carbon paper are no longer formed and the contact resistance exceeds 10 mΩ·cm².

(C3) In the pickling after the formation of the titanium compound-containing layer at the titanium base material surface by the annealing or shot blasting method, a hydrochloric acid aqueous solution may also be used.

The material is immersed in 1 to 10 mass % of a hydrochloric acid aqueous solution at 20 to 50° C. temperature for 5 to 180 minutes (300 to 10800 seconds), then rinsed and dried. In the process of immersion in the hydrochloric acid aqueous solution, the following reaction occurs. That is, part of the titanium compound or titanium compound particles which is formed by the annealing process or shot blasting process dissolves and becomes hydrated ions of titanium which are eluted into the hydrochloric acid aqueous solution. The titanium compound becomes particle shaped and then a dehydration-condensation reaction causes one or more types of titanium oxide of $Ti_4O_5$, $Ti_3O_5$, $Ti_2O_3$, $TiO_2$, $TiO$, or amorphous titanium oxide of an indeterminate ratio of composition to precipitate in a mixed state at the surface of the titanium compound particles and further to form a film on the surface of the titanium base material by the titanium compound particles and titanium oxide. Such a film becomes a protective film in the fuel cell operating environment. In the process, the titanium compound which is formed by the cold rolling and the annealing or the titanium compound particles which are formed by the shot blasting are reduced in size and become a diameter of 50 nm to 1 μm and the contents of carbon and nitrogen in the film total 5 to 40 at %.

The reason for limiting the concentration of the hydrochloric acid aqueous solution to 1 to 10 mass % will be explained below.

If the concentration of the hydrochloric acid aqueous solution is less than 1 mass %, there is little elution of titanium ions from the titanium compound particles, so the size of the titanium compound particles is not reduced and the diameter exceeds 1 µm. Further, there is little precipitation of titanium oxide which is formed by the dehydration-condensation reaction, so the contents of the carbon and nitrogen in the film total over 40 at %. For this reason, corrosion resistance of the film is not obtained and the contact resistances after the corrosion resistance test and after the power generation test become high. If the concentration of hydrochloric acid is over 10 mass %, the elution of titanium ions from the titanium compound particles becomes excessive, so the titanium compound particles are reduced in size and become diameters of less than 50 nm. Further, the precipitation of titanium oxide which is formed by the dehydration-condensation reaction is excessive, so the content of carbon and nitrogen in the film becomes a total of less than 5 at %. Therefore, the paths formed by the titanium compound particles connecting the titanium base material and the carbon paper are no longer formed and the contact resistance exceeds 10 mΩ·cm².

The reason for limiting the temperature of the hydrochloric acid aqueous solution to 20 to 50° C. will be explained below.

If the solution temperature of the hydrochloric acid aqueous solution is less than 20° C., there is little elution of titanium ions from the titanium compound particles, so the titanium compound particles are not reduced in size and the diameter exceeds 1 µm. Further, there is little precipitation of titanium oxide which is formed by the dehydration-condensation reaction, so the contents of the carbon and nitrogen in the film total over 40 at %. For this reason, corrosion resistance of the film is not obtained and the contact resistances after the corrosion resistance test and after the power generation test become high. If the solution temperature is over 50° C., the elution of titanium ions from the titanium compound particles becomes excessive, so the titanium compound particles are reduced in size and become a diameter of less than 50 nm. Further, the precipitation of titanium oxide which is formed by the dehydration-condensation reaction is excessive, so the content of the titanium compound in the film, converted to at % of carbon and nitrogen in the film, becomes a total of less than 5%. Therefore, the paths formed by the titanium compound particles connecting the titanium base material and the carbon paper are no longer formed and the contact resistance exceeds 10 mΩ·cm².

The reason for limiting the time for immersion in the hydrochloric acid aqueous solution 5 to 180 minutes (300 to 10800 seconds) will be explained next.

With an immersion time of less than 5 minutes (300 seconds), there is little elution of titanium ions from the titanium compound particles, so the size of the titanium compound particles is not reduced and the diameter exceeds 1 µm. Further, there is little precipitation of titanium oxide formed by the dehydration-condensation reaction, so the contents of carbon and nitrogen in the film total over 40 at %. Therefore, corrosion resistance of the film is not obtained and the contact resistance after the corrosion resistance test and after the power generation test becomes higher. If the immersion time exceeds 180 minutes (10800 seconds), the elution of titanium ions from the titanium compound particles becomes excessive, so the titanium compound is reduced in size and becomes a diameter of less than 50 nm. Further, the precipitation of titanium oxide which is formed by the dehydration-condensation reaction is excessive, so the contents of carbon and nitrogen in the film total less than 5 at %. Therefore, the paths formed by the titanium compound particles connecting the titanium base material and the carbon paper are no longer formed and the contact resistance exceeds 10 mΩ·cm².

(C4) In the pickling after the formation of the titanium compound-containing layer at the titanium base material surface by the annealing or shot blasting method, aqua regia may, also be used.

The material is immersed in 20 to 80° C. aqua regia for 5 to 180 minutes (300 to 10800 seconds), then rinsed and dried. In the process of immersion in the aqua regia, the following reaction occurs. That is, part of the titanium compound or titanium compound particles which is formed by the annealing process or shot blasting process dissolves and becomes hydrated ions of titanium which are eluted into the aqua regia. The titanium compound becomes particle shaped and then a dehydration-condensation reaction causes one or more types of titanium oxide of $Ti_4O_5$, $Ti_3O_5$, $Ti_2O_3$, $TiO_2$, $TiO$, or amorphous titanium oxide of an indeterminate ratio of composition to precipitate in a mixed state at the surface of the titanium compound particles and further to form a film on the surface of the titanium base material by the titanium compound particles and titanium oxide. Such a film becomes a protective film in the fuel cell operating environment. In the process, the titanium compound which is formed by the cold rolling and the annealing or the titanium compound particles which are formed by the shot blasting are reduced in size and become a diameter of 50 nm to 1 µm and the contents of carbon and nitrogen in the film total 5 to 40 at %.

The reason for limiting the temperature of the aqua regia to 20 to 80° C. will be explained below.

If the solution temperature of the aqua regia is less than 20° C., there is little elution of titanium ions from the titanium compound particles, so the titanium compound particles are not reduced in size and the diameter exceeds 1 µm. Further, there is little precipitation of titanium oxide which is formed by the dehydration-condensation reaction, so the contents of the carbon and nitrogen in the film total over 40 at %. For this reason, corrosion resistance of the film is not obtained and the contact resistances after the corrosion resistance test and after the power generation test become high. If the solution temperature is over 80° C., the elution of titanium ions from the titanium compound particles becomes excessive, so the titanium compound particles are reduced in size and become a diameter of less than 50 nm. Further, the precipitation of titanium oxide which is formed by the dehydration-condensation reaction is excessive, so the contents of carbon and nitrogen in the film total less than 5 at %. Therefore, the paths formed by the titanium compound particles connecting the titanium base material and the carbon paper are no longer formed and the contact resistance exceeds 10 mΩ·cm².

The reason for limiting the time of immersion in aqua regia to 5 to 180 minutes (300 to 10800 seconds) will be explained below.

If the immersion time is less than 5 minutes (300 seconds), there is little elution of titanium ions from the titanium compound particles, so the size of the titanium compound particles will not be reduced and the diameter will exceed 1 µm. Further, there is little precipitation of titanium oxide formed by the dehydration-condensation reaction, so the contents of carbon and nitrogen in the film will total over 40 at %. For this reason, corrosion resistance of the film is not obtained and the contact resistance after the corrosion resistance test and after the power generation test becomes high. If the immersion time exceeds 180 minutes (10800 seconds), the elution of titanium ions from the titanium compound particles becomes excessive, so the titanium compound particles are reduced in size and the diameter becomes less than 50 nm. Further, the precipitation of titanium oxide formed by the dehydration-condensation reaction is excessive, so the contents of carbon and nitrogen in the film total less than 5 at %. Therefore, the paths formed by the titanium compound particles connecting the titanium base material and the carbon paper are no longer formed and the contact resistance exceeds 10 mΩ·cm².

Here, the method of production for adjusting the thickness of the film of the present invention to 100 nm to 1 μm will be explained.

The thickness of the film of the present invention is adjusted by the temperature and time of chemical immersion. That is, after forming the titanium compound layer by the annealing treatment or after forming the titanium compound particle-containing layer by the shot blasting method, the film is immersed in one of a nitric acid aqueous solution, a sulfuric acid aqueous solution, a hydrochloric acid aqueous solution, or aqua regia to cause the precipitation of titanium oxide and obtain a film comprised of titanium compound particles and titanium oxide. The conditions of the temperature and time of chemical immersion determine the elution of titanium from the titanium compound layer or titanium compound particle-containing layer formed by the shot blasting method, the amount of precipitation of titanium oxide, and the average diameter of the titanium compound particles and determine the thickness of the film of the present invention comprised of the titanium compound particles and titanium oxide.

The inventors studied the relationship between the temperature and immersion time of the nitric acid aqueous solution, sulfuric acid aqueous solution, hydrochloric acid aqueous solution, and aqua regia and the thickness of the film and average diameter of the compound particles of the present invention and as a result discovered that by setting the temperature and immersion time to the above conditions, the thickness of the film of the present invention becomes 100 nm to 1 μm.

The thickness of the surface film of the titanium sheet for separator use produced by the above method is analyzed by glow discharge spectrometry (GDS). The profile in the depth direction is measured for Ti, O, C, and N and the value evaluated as the thickest is made the film thickness. Further, GDS is used to assay the C and N in the film and evaluate the content of the titanium compound. The C and N in the film are present as a compound with titanium, so the total of the C and N contents in the film assayed by GDS becomes an indicator of the amount of the titanium compound in the film.

The ratio of the area of the titanium base material surface which the film covers to the area of the test material as a whole is defined as the coverage rate of the film. The coverage rate of the film is determined by observing the test material surface by a scan electron microscope and taking an image of reflected electrons. The method will be explained below.

First, an image of the reflected electrons of the pure titanium surface is captured and the brightness of the image is measured. The conditions for observation of the reflected electron image may be set to, for example, an acceleration voltage of 5 kV and an observation power of X1000. The same conditions are used to observe the reflected electron image of the test materials. The film part is comprised of titanium oxide, carbide, nitride, and carbonitride, so the brightness of the electrons reflected from the film is smaller than the brightness of the electrons reflected from pure titanium. On the other hand, the brightness of the electrons reflected from a part where there is no film and the titanium is exposed is equal to the brightness of the electrons reflected from pure titanium photographed above. The captured reflected electron image is binarized by the brightness of the electrons reflected from the pure titanium and the brightness of the electrons reflected from the film. The ratio of the part corresponding to the film in the screen as a whole is defined as the film coverage rate.

The oxides and the titanium compounds of the film on the surfaces of the test materials are identified and the average diameters of the titanium compound particles are measured by observation under a transmission electron microscope using the extraction replica method explained below.

The surface of a test material is lightly electrolytically etched, coated with methyl acetate, then adhered with acetyl cellulose which is then pulled off. The result is placed on a Cu mesh and observed by a transmission electron microscope. An energy dispersive X-ray detector is used to measure the characteristic X-rays. Electron diffraction is measured to identify the oxides and titanium compounds of the film on the surface of the test materials and measure the average diameter of the titanium compound particles.

EXAMPLES

Examples will be used to explain the present invention in detail.

A sheet of industrial-use pure titanium JIS type 1 was cold rolled while using a cold rolling oil to obtain a 0.2 mm thick sheet. Next, this was cut into lengths of 100 mm and widths of 100 mm to obtain test pieces. These were immersed in a pH 12 aqueous alkali degreasing agent for 5 minutes to 30 minutes for degreasing to thereby remove part of the cold rolling oil from the surface. The amount of deposition of carbon was adjusted by the immersion time. Part of the test pieces of the cold rolled titanium sheet were not degreased but were left with the cold rolling oil as deposited in the cold rolling. Each obtained cold rolled titanium sheet surface was analyzed by GDS and the amount of C at the surface layer was assayed. Next, the test pieces were raised in temperature in a dew point −50 to −10° C. argon, dew point −50 to −10° C. nitrogen, and dew point −50 to −10° C. 50 vol % argon and 50 vol % nitrogen mixed gas to 700 to 950° C. and held there for soaking for 10 to 150 seconds to obtain the test materials.

The gas which was introduced into the annealing furnace was made a pressure of 1 atmosphere, while the dew point was controlled by adjusting the flow rate of the gas. That is, when making the dew point −40° C. or less, the gas was continuously run during the annealing, while when making the dew point higher than −40° C., the gas was sealed in the furnace.

Next, the test materials were immersed in a mass % concentration 10 to 70%, 40 to 100° C. nitric acid aqueous solution, pH 0.5 to 2, 60 to 100° C. sulfuric acid aqueous solution, mass % concentration 0.5 to 15%, 10 to 60° C. hydrochloric acid aqueous solution, and 10 to 90° C. aqua regia respectively for 1 to 200 minutes (60 to 12000 seconds), then rinsed and dried. Details of the above test materials and production conditions, annealing conditions, and pickling conditions are shown in Table 1-1 and Table 1-2.

Further, the test pieces after cold rolling and cutting into lengths of 100 mm and widths of 100 mm had titanium compound particles deposited on them by the shot blasting method explained below. Average particle size 5 to 50 μm TiN, Ti$_2$N, TiC, and Ti$_2$C particles were charged into a coating solution using a methacrylic acid copolymer as a solute and ethanol as a solvent to thereby obtain a suspension. This was coated over superhard core particles made of tungsten carbide having an average particle size of 100 μm to prepare blasting particles. At that time, the ratio of the conductive compound particles to the mass of the superhard core particles was made 0.5 to 15 mass %. Next, the above blasting particles were driven into the surfaces of the above test materials by a blasting pressure of 0.1 MPa to 0.6 MPa in an amount of 5 to 120 g per 1 cm² of the base material.

Next, the test materials were immersed in a mass % concentration 10 to 70%, 40 to 100° C. nitric acid aqueous solution, pH0.5 to 2, 60 to 100° C. sulfuric acid aqueous solution, mass % concentration 0.5 to 15%, 10 to 60° C. hydrochloric acid aqueous solution, and 10 to 90° C. aqua regia for 1 to 200 minutes, then rinsed and dried. For the test materials, Table 2 shows the conditions for driving titanium compound particles into the titanium sheets by the shot blasting method and the conditions for pickling.

The test materials prepared under the conditions of Table 1-1, Table 1-2, and Table 2 were analyzed at their surfaces by GDS, evaluated for thickness of the film, and evaluated for content of the titanium compound in the film by assay of the C and N in the film. Further, the test material surfaces were observed under a scan electron microscope for reflected electron image and measured for coverage rate of the film by image analysis. Further, the substances extracted from the test material surfaces by the extraction replica method were observed under a transmission electron microscope (TEM). They were identified as substances of the film of the test material surfaces and simultaneously were measured for average diameter of the compound particles. Furthermore, 20 or more particles were observed and image analysis used to measure the circle equivalent diameter of the particles and find the average diameter.

The test materials of Table 1-1, Table 1-2, and Table 2 were brought into contact with carbon paper at the film formed at the titanium base material surface. The value of the contact resistance with carbon paper was measured at a surface pressure of 1 kgf/cm² (9.8×10⁴ Pa). The case where the measured value of the contact resistance was 10 mΩ·cm² or less was evaluated as "passed" in the initial contact resistance, while the case where of over 10 mΩ·cm² was evaluated as "not passing" in the initial contact resistance.

Furthermore, to evaluate the durability, a test material was immersed in an 80° C., pH4.0 sulfuric acid aqueous solution for seven days, then the contact resistance value to carbon paper was measured at a surface pressure of 1 kgf/cm² (9.8× 10⁴ Pa). The case where the measured value of the contact resistance was 10 mΩ·cm² or less was evaluated as "passed" in durability, while the case where of over 10 mΩ-cm² was evaluated as "not passing" in durability.

Part of the test materials were subjected to a power generation test for 5000 hours (18×10⁶ seconds). The contact resistance to carbon paper was measured at a surface pressure of 1 kgf/cm² (9.8×10⁴ Pa). The case where the contact resistance value was 10 mΩ·cm² or less was evaluated as "passed" in durability, while the case where of over 10 mΩ·cm² was evaluated as "not passing" in durability.

The results of measurement of the film thickness, the surface coverage rate by the film, the type of titanium oxide forming the film, the type of titanium compound in the film, the average diameter of the titanium compound particles, the value of the amount of titanium compound in the film evaluated by the contents of C and N in the film, the initial contact resistance, the results of evaluation of durability, and the contact resistance after the power generation test are shown in Table 3-1, Table 3-2, Table 3-3, and Table 3-4. In Table 3-1, Table 3-2, Table 3-3, and Table 3-4, the types of titanium oxide are indicated by the following symbols: a: $Ti_4O_5$, b: $Ti_3O_5$, c: $Ti_2O_2$, d: $TiO_2$, e: TiO, f: amorphous titanium oxide with indeterminate ratio of composition. The types of the titanium compounds are indicated by the following symbols: A: TiN, B: $Ti_2N$, C: $Ti_{2.85}N_1O_4$, D: $TiN_{0.96}$, E: TiC, F: $Ti_2C$, G: $TiC_{0.98}$, H: $Ti_2CN$, I: $TiC_{0.7}N_{0.3}$, J: $TiC_{0.62}$, K: $TiC_{0.59}$, L: $TiN_{0.12}C_{0.51}$, M: $TiC_{0.3}N_{0.7}$, and N: $TiC_{0.2}N_{0.8}$.

TABLE 1-1

| Test no. | Alkali immersion degreasing time (min) | Results of measurement of deposition of carbon by GDS (mg/m²) | Atmospheric gas | Dew point (° C.) | Heating temperature (° C.) | Heating time (min) | Type of acid | Concentration | Temperature (° C.) | Time (sec) | |
|---|---|---|---|---|---|---|---|---|---|---|---|
| 1 | No degreasing | 250 | Ar | −50 | 700 | 120 | Nitric acid | 20 mass % | 80 | 100 | Comp. ex. |
| 2 | 10 | 120 | Ar | −50 | 700 | 120 | Nitric acid | 40 mass % | 80 | 100 | Inv. ex. |
| 3 | 10 | 120 | Ar | −50 | 650 | 5 | Nitric acid | 20 mass % | 80 | 100 | Comp. ex. |
| 4 | 20 | 10 | Ar | −50 | 800 | 30 | Nitric acid | 40 mass % | 50 | 5 | Inv. ex. |
| 5 | 30 | 5 | Ar | −50 | 800 | 60 | Nitric acid | 40 mass % | 80 | 100 | Comp. ex. |
| 6 | 10 | 120 | Ar | −10 | 800 | 60 | Nitric acid | 20 mass % | 80 | 100 | Comp. ex. |
| 7 | 20 | 10 | Ar | −50 | 1000 | 200 | Nitric acid | 40 mass % | 80 | 100 | Comp. ex. |
| 8 | 5 | 200 | Ar | −50 | 800 | 60 | Nitric acid | 40 mass % | 80 | 100 | Inv. ex. |
| 9 | 5 | 200 | Ar | −50 | 800 | 60 | Nitric acid | 10 mass % | 80 | 100 | Comp. ex. |
| 10 | 5 | 200 | Ar | −50 | 800 | 60 | Nitric acid | 20 mass % | 40 | 100 | Comp. ex. |
| 11 | 5 | 200 | Ar | −50 | 800 | 60 | Nitric acid | 20 mass % | 50 | 2 | Comp. ex. |
| 12 | 5 | 200 | Ar | −50 | 800 | 60 | Nitric acid | 40 mass % | 80 | 200 | Comp. ex. |
| 13 | 5 | 200 | Ar | −50 | 800 | 60 | Nitric acid | 40 mass % | 100 | 100 | Comp. ex. |
| 14 | 5 | 200 | Ar | −50 | 800 | 60 | Nitric acid | 70 mass % | 80 | 100 | Comp. ex. |
| 15 | 10 | 120 | Ar | −50 | 800 | 120 | Nitric acid | 20 mass % | 95 | 180 | Inv. ex. |
| 16 | 5 | 200 | Ar | −40 | 700 | 120 | Nitric acid | 60 mass % | 50 | 180 | Inv. ex. |
| 17 | 10 | 120 | Ar | −50 | 950 | 60 | Nitric acid | 40 mass % | 80 | 100 | Inv. ex. |
| 18 | 20 | 10 | Ar | −40 | 800 | 120 | Nitric acid | 20 mass % | 95 | 180 | Inv. ex. |
| 19 | 5 | 200 | Ar | −50 | 800 | 60 | Sulfuric acid | pH 0.5 | 70 | 5 | Inv. ex. |
| 20 | 5 | 200 | Ar | −50 | 800 | 60 | Sulfuric acid | pH 1 | 70 | 5 | Inv. ex. |
| 21 | 5 | 200 | Ar | −40 | 700 | 120 | Sulfuric acid | pH 2 | 95 | 180 | Inv. ex. |
| 22 | 5 | 200 | Ar | −50 | 800 | 60 | Sulfuric acid | pH 1 | 80 | 200 | Comp. ex. |
| 23 | 5 | 200 | Ar | −50 | 800 | 60 | Sulfuric acid | pH 2 | 60 | 2 | Comp. ex. |
| 24 | 5 | 200 | Ar | −50 | 800 | 60 | Sulfuric acid | pH 3 | 80 | 100 | Comp. ex. |
| 25 | 5 | 200 | Ar | −50 | 800 | 60 | Sulfuric acid | pH 0.2 | 80 | 100 | Comp. ex. |
| 26 | 5 | 200 | Ar | −50 | 800 | 60 | Hydrochloric acid | 1 mass % | 20 | 100 | Inv. ex. |
| 27 | 5 | 200 | Ar | −50 | 800 | 60 | Hydrochloric acid | 10 mass % | 20 | 5 | Inv. ex. |

TABLE 1-1-continued

| Test no. | Alkali immersion degreasing time (min) | Results of measurement of deposition of carbon by GDS (mg/m²) | Atmospheric gas | Dew point (° C.) | Heating temperature (° C.) | Heating time (min) | Type of acid | Concentration | Temperature (° C.) | Time (sec) | |
|---|---|---|---|---|---|---|---|---|---|---|---|
| 28 | 5 | 200 | Ar | −50 | 800 | 60 | Hydrochloric acid | 5 mass % | 50 | 180 | Inv. ex. |
| 29 | 5 | 200 | Ar | −50 | 800 | 60 | Hydrochloric acid | 0.5 mass % | 30 | 100 | Comp. ex. |
| 30 | 5 | 200 | Ar | −50 | 800 | 60 | Hydrochloric acid | 5 mass % | 30 | 2 | Comp. ex. |
| 31 | 5 | 200 | Ar | −50 | 800 | 60 | Hydrochloric acid | 10 mass % | 10 | 2 | Comp. ex. |
| 32 | 5 | 200 | Ar | −50 | 800 | 60 | Hydrochloric acid | 15 mass % | 30 | 100 | Comp. ex. |
| 33 | 5 | 200 | Ar | −50 | 800 | 60 | Aqua regia | | 20 | 5 | Inv. ex. |
| 34 | 5 | 200 | Ar | −50 | 800 | 60 | Aqua regia | | 80 | 180 | Inv. ex. |
| 35 | 5 | 200 | Ar | −50 | 800 | 60 | Aqua regia | | 80 | 200 | Comp. ex. |
| 36 | 5 | 200 | Ar | −50 | 800 | 60 | Aqua regia | | 90 | 100 | Comp. ex. |

TABLE 1-2

| Test no. | Alkali immersion degreasing time (min) | Results of measurement of deposition of carbon by GDS (mg/m²) | Atmospheric gas | Dew point (° C.) | Heating temperature (° C.) | Heating time (min) | Type of acid | Concentration | Temperature (° C.) | Time (sec) | |
|---|---|---|---|---|---|---|---|---|---|---|---|
| 37 | No degreasing | 250 | N₂ | −50 | 700 | 120 | Nitric acid | 20 mass % | 80 | 100 | Comp. ex. |
| 38 | 10 | 120 | N₂ | −50 | 700 | 120 | Nitric acid | 40 mass % | 80 | 100 | Inv. ex. |
| 39 | 10 | 120 | N₂ | −50 | 650 | 5 | Nitric acid | 20 mass % | 80 | 100 | Comp. ex. |
| 40 | 20 | 10 | N₂ | −50 | 800 | 30 | Nitric acid | 40 mass % | 50 | 5 | Inv. ex. |
| 41 | 30 | 5 | N₂ | −50 | 800 | 60 | Nitric acid | 40 mass % | 80 | 100 | Comp. ex. |
| 42 | 10 | 120 | N₂ | −10 | 800 | 60 | Nitric acid | 20 mass % | 80 | 100 | Comp. ex. |
| 43 | 20 | 10 | N₂ | −50 | 1000 | 200 | Nitric acid | 40 mass % | 80 | 100 | Comp. ex. |
| 44 | 5 | 200 | N₂ | −50 | 800 | 60 | Nitric acid | 40 mass % | 80 | 100 | Inv. ex. |
| 45 | 5 | 200 | N₂ | −50 | 800 | 60 | Nitric acid | 10 mass % | 80 | 100 | Comp. ex. |
| 46 | 5 | 200 | N₂ | −50 | 800 | 60 | Nitric acid | 20 mass % | 40 | 100 | Comp. ex. |
| 47 | 5 | 200 | N₂ | −50 | 800 | 60 | Nitric acid | 20 mass % | 50 | 2 | Comp. ex. |
| 48 | 5 | 200 | N₂ | −50 | 800 | 60 | Nitric acid | 40 mass % | 80 | 200 | Comp. ex. |
| 49 | 5 | 200 | N₂ | −50 | 800 | 60 | Nitric acid | 40 mass % | 100 | 100 | Comp. ex. |
| 50 | 5 | 200 | N₂ | −50 | 800 | 60 | Nitric acid | 70 mass % | 80 | 100 | Comp. ex. |
| 51 | 10 | 120 | N₂ | −50 | 800 | 120 | Nitric acid | 20 mass % | 95 | 180 | Inv. ex. |
| 52 | 5 | 200 | N₂ | −40 | 700 | 120 | Nitric acid | 60 mass % | 50 | 180 | Inv. ex. |
| 53 | 10 | 120 | N₂ | −50 | 950 | 60 | Nitric acid | 40 mass % | 80 | 100 | Inv. ex. |
| 54 | 20 | 10 | N₂ | −40 | 800 | 120 | Nitric acid | 20 mass % | 95 | 180 | Inv. ex. |
| 55 | 5 | 200 | N₂ | −50 | 800 | 60 | Sulfuric acid | pH 0.5 | 70 | 5 | Inv. ex. |
| 56 | 5 | 200 | N₂ | −50 | 800 | 60 | Sulfuric acid | pH 1 | 70 | 5 | Inv. ex. |
| 57 | 5 | 200 | N₂ | −40 | 700 | 120 | Sulfuric acid | pH 2 | 95 | 180 | Inv. ex. |
| 58 | 5 | 200 | N₂ | −50 | 800 | 60 | Sulfuric acid | pH 1 | 80 | 200 | Comp. ex. |
| 59 | 5 | 200 | N₂ | −50 | 800 | 60 | Sulfuric acid | pH 2 | 60 | 2 | Comp. ex. |
| 60 | 5 | 200 | N₂ | −50 | 800 | 60 | Sulfuric acid | pH 3 | 80 | 100 | Comp. ex. |
| 61 | 5 | 200 | N₂ | −50 | 800 | 60 | Sulfuric acid | pH 0.2 | 80 | 100 | Comp. ex. |
| 62 | 5 | 200 | N₂ | −50 | 800 | 60 | Hydrochloric acid | 1 mass % | 20 | 100 | Inv. ex. |
| 63 | 5 | 200 | N₂ | −50 | 800 | 60 | Hydrochloric acid | 10 mass % | 20 | 5 | Inv. ex. |
| 64 | 5 | 200 | N₂ | −50 | 800 | 60 | Hydrochloric acid | 5 mass % | 50 | 180 | Inv. ex. |
| 65 | 5 | 200 | N₂ | −50 | 800 | 60 | Hydrochloric acid | 0.5 mass % | 30 | 100 | Comp. ex. |
| 66 | 5 | 200 | N₂ | −50 | 800 | 60 | Hydrochloric acid | 5 mass % | 30 | 2 | Comp. ex. |
| 67 | 5 | 200 | N₂ | −50 | 800 | 60 | Hydrochloric acid | 10 mass % | 10 | 2 | Comp. ex. |
| 68 | 5 | 200 | N₂ | −50 | 800 | 60 | Hydrochloric acid | 15 mass % | 30 | 100 | Comp. ex. |
| 69 | 5 | 200 | N₂ | −50 | 800 | 60 | Aqua regia | | 20 | 5 | Inv. ex. |
| 70 | 5 | 200 | N₂ | −50 | 800 | 60 | Aqua regia | | 80 | 180 | Inv. ex. |
| 71 | 5 | 200 | N₂ | −50 | 800 | 60 | Aqua regia | | 80 | 200 | Comp. ex. |
| 72 | 5 | 200 | N₂ | −50 | 800 | 60 | Aqua regia | | 90 | 100 | Comp. ex. |
| 73 | 5 | 200 | 50% Ar + 50% N₂ | −40 | 700 | 30 | Nitric acid | 40 mass % | 80 | 100 | Inv. ex. |
| 74 | 5 | 200 | 50% Ar + 50% N₂ | −50 | 950 | 120 | Hydrochloric acid | 5 mass % | 30 | 100 | Inv. ex. |
| 75 | 20 | 10 | 50% Ar + 50% N₂ | −50 | 800 | 80 | Hydrochloric acid | 10 mass % | 50 | 180 | Inv. ex. |
| 76 | 5 | 200 | 50% Ar + 50% N₂ | −50 | 1000 | 200 | Nitric acid | 40 mass % | 80 | 100 | Comp. ex. |
| 77 | 5 | 200 | 50% Ar + 50% N₂ | −40 | 650 | 5 | Nitric acid | 40 mass % | 80 | 100 | Comp. ex. |

TABLE 2

| Test no. | Compound | Amount driven in (g/cm²) | Type of acid | Concentration | Temperature (° C.) | Time (sec) | |
|---|---|---|---|---|---|---|---|
| 78 | TiN | 10 | Nitric acid | 20 mass % | 80 | 80 | Inv. ex. |
| 79 | TiN | 10 | Nitric acid | 40 mass % | 80 | 50 | Inv. ex. |
| 80 | TiN | 100 | Nitric acid | 20 mass % | 80 | 100 | Inv. ex. |
| 81 | TiN | 120 | Nitric acid | 40 mass % | 50 | 5 | Inv. ex. |
| 82 | TiN | 10 | Nitric acid | 40 mass % | 80 | 100 | Inv. ex. |
| 83 | TiN | 10 | Nitric acid | 20 mass % | 80 | 150 | Inv. ex. |
| 84 | TiN | 10 | Nitric acid | 40 mass % | 80 | 130 | Inv. ex. |
| 85 | $Ti_2N$ | 10 | Nitric acid | 40 mass % | 80 | 100 | Inv. ex. |
| 86 | TiN | 10 | Nitric acid | 10 mass % | 80 | 100 | Comp. ex. |
| 87 | TiN | 10 | Nitric acid | 20 mass % | 40 | 100 | Comp. ex. |
| 88 | TiN | 10 | Nitric acid | 20 mass % | 50 | 2 | Comp. ex. |
| 89 | TiN | 10 | Nitric acid | 40 mass % | 80 | 200 | Comp. ex. |
| 90 | TiN | 10 | Nitric acid | 40 mass % | 100 | 100 | Comp. ex. |
| 91 | TiC | 10 | Nitric acid | 70 mass % | 80 | 100 | Comp. ex. |
| 92 | TiC | 5 | Nitric acid | 20 mass % | 95 | 180 | Inv. ex. |
| 93 | TiC | 50 | Nitric acid | 60 mass % | 50 | 120 | Inv. ex. |
| 94 | TiC | 100 | Nitric acid | 40 mass % | 80 | 100 | Inv. ex. |
| 95 | TiC | 120 | Nitric acid | 20 mass % | 95 | 60 | Inv. ex. |
| 96 | TiC | 120 | Sulfuric acid | pH 0.5 | 70 | 5 | Inv. ex. |
| 97 | TiC | 120 | Sulfuric acid | pH 1 | 70 | 5 | Inv. ex. |
| 98 | TiC | 120 | Sulfuric acid | pH 2 | 95 | 180 | Inv. ex. |
| 99 | TiC | 120 | Sulfuric acid | pH 1 | 80 | 200 | Comp. ex. |
| 100 | TiC | 120 | Sulfuric acid | pH 2 | 60 | 2 | Comp. ex. |
| 101 | TiC | 120 | Sulfuric acid | pH 3 | 80 | 100 | Comp. ex. |
| 102 | TiC | 120 | Sulfuric acid | pH 0.2 | 80 | 100 | Comp. ex. |
| 103 | $Ti_2C$ | 100 | Hydrochloric acid | 1 mass % | 20 | 100 | Inv. ex. |
| 104 | $Ti_2C$ | 100 | Hydrochloric acid | 10 mass % | 20 | 5 | Inv. ex. |
| 105 | $Ti_2C$ | 100 | Hydrochloric acid | 5 mass % | 50 | 180 | Inv. ex. |
| 106 | TiC | 120 | Hydrochloric acid | 0.5 mass % | 30 | 100 | Comp. ex. |
| 107 | TiC | 120 | Hydrochloric acid | 5 mass % | 30 | 2 | Comp. ex. |
| 108 | TiC | 120 | Hydrochloric acid | 10 mass % | 10 | 2 | Comp. ex. |
| 109 | TiC | 120 | Hydrochloric acid | 15 mass % | 30 | 100 | Comp. ex. |
| 110 | TiC | 120 | Aqua regia | | 20 | 5 | Inv. ex. |
| 111 | TiC | 120 | Aqua regia | | 80 | 180 | Inv. ex. |
| 112 | TiC | 120 | Aqua regia | | 80 | 200 | Comp. ex. |
| 113 | TiC | 10 | Aqua regia | | 90 | 100 | Comp. ex. |
| 114 | TiC | 10 | Nitric acid | 40 mass % | 80 | 100 | Inv. ex. |
| 115 | TiC | 10 | Hydrochloric acid | 5 mass % | 30 | 100 | Inv. ex. |
| 116 | TiC | 10 | Hydrochloric acid | 10 mass % | 50 | 180 | Inv. ex. |
| 117 | TiC | 10 | Nitric acid | 40 mass % | 80 | 100 | Inv. ex. |
| 118 | TiC | 10 | Nitric acid | 40 mass % | 80 | 100 | Inv. ex. |

TABLE 3-1

| Test no. | Thickness of film (μm) | Surface coverage of film (%) | Titanium oxide forming film | Titanium compound particles | Diameter of titanium compound particles (μm) | Content of nitrogen and carbon in film (at %) | Initial value of contact resistance (mΩ·cm²) | Results of evaluation of durability (mΩ·cm²) | Power generation test (mΩ·cm²) | Test results |
|---|---|---|---|---|---|---|---|---|---|---|
| 1 | 5 | 95 | f | E, F, D | 5 | 45 | 3 | 100 | 9 | C large, so TiC size large, Ti compound excessive, and durability "not passing" |
| 2 | 1 | 50 | d, f | E, F, A, B | 0.5 | 22 | 3 | 7 | | Initial contact resistance and durability both "passed". Power generation test also "passed" |
| 3 | 0.05 | 15 | d, f | A, E | 0.01 | 4 | 16 | 157 | 240 | Heating temperature low, so little compound formed and contact resistance "not passing" |
| 4 | 0.7 | 40 | c, d, e, f | A, B, E, F | 0.05 | 5 | 9 | 9 | 10 | Initial contact resistance and durability both "passed" |
| 5 | 1.1 | 15 | d, f | A, E | 0.04 | 3 | 21 | 204 | | C small, so coverage and titanium Ti compound amount small, contact resistance and durability "not passing" |
| 6 | 10 | 95 | d, f | M, D, E | 0.1 | 2 | 105 | 124 | | Base material oxidized and contact resistance "not passing" |
| 7 | 2 | 50 | c, d, f | E, F, D | 2 | 49 | 2 | 15 | | Heating temperature high, heating time long, so Ti compound excessive and durability "not passing" |
| 8 | 1 | 20 | a, b, d, f | C, E, F, N | 1 | 40 | 5 | 6 | 8 | Initial contact resistance and durability both "passed". Power generation test also "passed" |
| 9 | 1.5 | 18 | d, e, f | A, E | 1.5 | 45 | 8 | 55 | | Acid concentration low, durability "not passing" |
| 10 | 1.2 | 18 | d, e, f | A, E | 1.2 | 41 | 3 | 84 | | Acid treatment temperature low, durability "not passing" |
| 11 | 1.2 | 15 | d, e, f | A, E | 1.2 | 47 | 4 | 91 | | Acid treatment time short, durability "not passing" |
| 12 | 1.1 | 15 | d, e, f | A, E | 0.04 | 3 | 21 | 34 | | Acid treatment time long, initial contact resistance "not passing" |
| 13 | 1.4 | 18 | d, e, f | A, E | 0.01 | 2 | 44 | 48 | | Acid treatment temperature high, Ti compound excessively small, initial contact resistance "not passing" |
| 14 | 1.6 | 14 | d, e, f | A, E, F | 0.03 | 4 | 15 | 27 | | Acid concentration high, Ti compound excessively small, initial contact resistance "not passing" |
| 15 | 0.5 | 50 | f | A, E, F | 0.1 | 33 | 2 | 3 | 5 | Initial contact resistance and durability both "passed" |
| 16 | 0.1 | 20 | d, f | A, E, F | 0.04 | 21 | 1 | 3 | 10 | Initial contact resistance and durability both "passed". Power generation test also "passed" |
| 17 | 0.5 | 50 | c, d, f | A, E, F, N | 0.07 | 40 | 2 | 4 | 3 | Initial contact resistance and durability both "passed" |
| 18 | 0.5 | 25 | f | E, F, H | 0.5 | 5 | 2 | 3 | 10 | Initial contact resistance and durability both "passed" |
| 19 | 1 | 60 | f, e, | E, K, L | 1 | 31 | 4 | 9 | | Initial contact resistance and durability both "passed" |
| 20 | 0.7 | 60 | f | E, G, D | 0.5 | 25 | 5 | 7 | | Initial contact resistance and durability both "passed" |
| 21 | 0.9 | 65 | a, e, f | I, J, M | 0.04 | 19 | 8 | 9 | | Initial contact resistance and durability both "passed" |
| 22 | 0.05 | 95 | f | E, D, M | 0.05 | 1 | 20 | 25 | | Long acid treatment time, Ti compound excessively small, initial contact resistance "not passing" |
| 23 | 1.1 | 20 | f | E, D, M | 1 | 45 | 3 | 210 | | Short acid treatment time, Ti compound excessive, durability "not passing" |
| 24 | 2 | 17 | f | E, N | 0.1 | 4 | 42 | 47 | | Acid concentration high, Ti compound excessively small, initial contact resistance "not passing" |
| 25 | 1.5 | 16 | f | E, F, L | 1.3 | 47 | 2 | 147 | | Low acid concentration, Ti compound excessive, durability "not passing" |
| 26 | 0.5 | 36 | b, f | A, I, E | 0.1 | 32 | 5 | 8 | | Initial contact resistance and durability both "passed" |
| 27 | 0.7 | 42 | f, d | A, E, F | 0.7 | 13 | 2 | 3 | | Initial contact resistance and durability both "passed" |
| 28 | 0.4 | 75 | f, d | A, E, F | 0.1 | 15 | 7 | 8 | | Initial contact resistance and durability both "passed" |
| 29 | 1.5 | 40 | c, d, f | E, B | 1.5 | 45 | 2 | 135 | | Low acid concentration, Ti compound excessive, durability "not passing" |
| 30 | 1.1 | 55 | c, d, f | E, B | 1.1 | 44 | 1 | 174 | | Short acid treatment time, Ti compound excessive, durability "not passing" |
| 31 | 1.7 | 51 | c, d, f | E, B | 1.7 | 47 | 2 | 152 | | Low acid treatment temperature, Ti compound excessive, durability "not passing" |
| 32 | 1.1 | 19 | c, d, f | E, B | 0.04 | 4 | 16 | 16 | | Acid concentration high, Ti compound excessively small, initial contact resistance "not passing" |
| 33 | 0.9 | 53 | f | K, M, B | 0.7 | 40 | 1 | 2 | | Initial contact resistance and durability both "passed" |
| 34 | 1 | 48 | f | I, E, N | 1 | 35 | 1 | 4 | | Initial contact resistance and durability both "passed" |
| 35 | 1.5 | 15 | f | E, F | 0.03 | 2 | 150 | 150 | | Long acid treatment time, Ti compound excessively small, initial contact resistance "not passing" |
| 36 | 1.6 | 13 | f | E, F | 0.02 | 1 | 200 | 200 | | Acid treatment temperature high, Ti compound excessively small, initial contact resistance "not passing" |

TABLE 3-2

| Test no. | Thickness of film (μm) | Surface coverage of film (%) | Titanium oxide forming film | Titanium compound particles | Diameter of titanium compound particles (μm) | Content of nitrogen and carbon in film (at %) | Initial value of contact resistance (mΩ·cm²) | Results of evaluation of durability (mΩ·cm²) | Power generation test (mΩ·cm²) | Test results |
|---|---|---|---|---|---|---|---|---|---|---|
| 37 | 3 | 97 | f | A, B | 3 | 44 | 4 | 170 | | C large, so Ti compound excessive and durability "not passing" |
| 38 | 0.9 | 45 | d, f | A, B, N | 0.4 | 23 | 4 | 9 | | Initial contact resistance and durability both "passed" |
| 39 | 1.1 | 11 | d, f, | A, E | 0.02 | 2 | 14 | 187 | | Heating temperature low, so Ti compound excessively small and contact resistance "not passing" |
| 40 | 0.7 | 47 | c, d, e, f | A, B, E, F | 0.05 | 7 | 8 | 9 | 10 | Initial contact resistance and durability both "passed" |
| 41 | 0.04 | 11 | d, f | A, E | 0.04 | 4 | 32 | 270 | | C small, so coverage and titanium Ti compound amount excessively small and contact resistance "not passing" |
| 42 | 11 | 95 | d, f | M, D, E | 0.1 | 3 | 140 | 140 | | Base material oxidized, Ti compound excessively small, and contact resistance "not passing" |
| 43 | 3 | 54 | c, d, f | E, F, D | 3 | 44 | 2 | 15 | | Heating temperature high, heating time long, so Ti compound excessive and durability "not passing" |
| 44 | 1 | 21 | a, b, d, f | A, C, N | 1 | 36 | 4 | 5 | 6 | Initial contact resistance and durability both "passed". Power generation test also "passed" |
| 45 | 1.1 | 37 | d, e, f | A, N | 1.1 | 47 | 4 | 60 | | Low acid concentration, Ti compound excessive, durability "not passing" |
| 46 | 1.3 | 48 | d, e, f | A, N | 1.3 | 47 | 2 | 94 | | Low acid treatment temperature, Ti compound excessive, durability "not passing" |
| 47 | 1.4 | 35 | d, e, f | A, N | 1.4 | 44 | 4 | 110 | | Short acid treatment time, Ti compound excessive, durability "not passing" |
| 48 | 1.1 | 45 | d, e, f | A, N | 0.04 | 4 | 24 | 30 | | Long acid treatment time, Ti compound excessively small, initial contact resistance "not passing" |
| 49 | 1.4 | 47 | d, e, f | A, | 0.03 | 3 | 44 | 57 | | Acid treatment temperature high, Ti compound excessively small, initial contact resistance "not passing" |
| 50 | 1.5 | 39 | d, e, f | A, B, M | 0.03 | 4 | 27 | 30 | | Acid concentration high, Ti compound excessively small, initial contact resistance "not passing" |
| 51 | 0.5 | 54 | f | A, B, M | 0.2 | 32 | 2 | 3 | 9 | Initial contact resistance and durability both "passed". Power generation test also "passed" |
| 52 | 0.5 | 30 | d, f | A, B, D | 0.06 | 32 | 1 | 2 | 10 | Initial contact resistance and durability both "passed" |
| 53 | 0.5 | 31 | c, d, f | A, B, N | 0.07 | 28 | 1 | 3 | 10 | Initial contact resistance and durability both "passed" |
| 54 | 0.4 | 25 | f | A, B, N | 0.4 | 7 | 2 | 3 | 9 | Initial contact resistance and durability both "passed" |
| 55 | 1 | 61 | f, e, | A, B, M | 1 | 34 | 4 | 7 | | Initial contact resistance and durability both "passed" |
| 56 | 0.7 | 72 | a, e, f | A, C, N | 0.5 | 28 | 5 | 7 | | Initial contact resistance and durability both "passed" |
| 57 | 0.5 | 64 | | A, M, N | 0.05 | 24 | 8 | 7 | | Long acid treatment time, Ti compound excessively small, initial contact resistance "not passing" |
| 58 | 1.5 | 84 | f | A, B, M | 0.05 | 2 | 20 | 30 | 10 | Initial contact resistance and durability both "passed" |
| 59 | 1.1 | 24 | f | A, B, M | 1 | 48 | 3 | 187 | | Short acid treatment time, Ti compound excessive, durability "not passing" |
| 60 | 2.1 | 51 | f | A, B, M | 0.2 | 5 | 42 | 47 | 9 | Acid concentration high, Ti compound excessively small, initial contact resistance "not passing" |

TABLE 3-2-continued

| Test no. | Thickness of film (μm) | Surface coverage of film (%) | Titanium oxide forming film | Titanium compound particles | Diameter of titanium compound particles (μm) | Content of nitrogen and carbon in film (at %) | Initial value of contact resistance (mΩ·cm²) | Results of evaluation of durability (mΩ·cm²) | Power generation test (mΩ·cm²) | Test results |
|---|---|---|---|---|---|---|---|---|---|---|
| 61 | 1.1 | 28 | f, d | A, B, M | 1.1 | 42 | 2 | 142 | | Low acid concentration, Ti compound excessive, durability "not passing" |
| 62 | 0.6 | 34 | b, f | A, B, N | 0.2 | 28 | 5 | 7 | | Initial contact resistance and durability both "passed" |
| 63 | 0.9 | 41 | f, d | A, B, N | 0.8 | 24 | 2 | 3 | | Initial contact resistance and durability both "passed" |
| 64 | 0.2 | 64 | f, d | A, B, N | 0.2 | 27 | 7 | 6 | 10 | Initial contact resistance and durability both "passed" |
| 65 | 1.5 | 21 | C, d, f | A, B, M | 1.5 | 45 | 2 | 129 | | Low acid concentration, Ti compound excessive, durability "not passing" |
| 66 | 1.1 | 57 | c, d, f | A, B, M | 1.1 | 45 | 1 | 164 | | Short acid treatment time, Ti compound excessive, durability "not passing" |
| 67 | 1.3 | 55 | c, d, f | A, B, M | 1.3 | 44 | 2 | 172 | | Low acid treatment temperature, Ti compound excessive, durability "not passing" |
| 68 | 1.4 | 64 | c, d, f | A, B, M | 0.8 | 3 | 16 | 23 | | Acid concentration high, Ti compound excessively small, initial contact resistance "not passing" |
| 69 | 0.9 | 51 | f | A, B, N | 0.8 | 39 | 1 | 5 | | Initial contact resistance and durability both "passed" |
| 70 | 1 | 48 | f | A, B, N | 1 | 35 | 1 | 3 | | Initial contact resistance and durability both "passed" |
| 71 | 1.5 | 51 | f | A, B, M | 0.04 | 2 | 150 | 140 | | Long acid treatment time, Ti compound excessively small, initial contact resistance "not passing" |
| 72 | 1.7 | 67 | f | A, B, M | 0.01 | 2 | 200 | 210 | | Acid treatment temperature high, Ti compound excessively small, initial contact resistance "not passing" |
| 73 | 1 | 35 | f, d | A, B, E, F, M, N | 0.1 | 34 | 2 | 4 | | Initial contact resistance and durability both "passed" |
| 74 | 0.5 | 48 | f, d | A, B, E, F, M, N | 0.3 | 26 | 3 | 7 | | Initial contact resistance and durability both "passed" |
| 75 | 0.7 | 44 | f, d | A, B, E, F, M, N | 0.1 | 17 | 5 | 5 | | Initial contact resistance and durability both "passed" |
| 76 | 1.5 | 50 | f, d | A, B, E, F, M, N | 1.5 | 45 | 1 | 140 | | Heating temperature high, heating time long, so Ti compound excessive and durability "not passing" |
| 77 | 0.05 | 55 | f, d | A, B, E, F, M, N | 0.02 | 4 | 15 | 20 | | Heating temperature low, so Ti compound formation excessively small and contact resistance "not passing" |

TABLE 3-3

| Test no. | Thickness of film (μm) | Surface coverage of film (%) | Titanium oxide forming film | Titanium compound particles | Diameter of titanium compound particles (μm) | Content of nitrogen and carbon in film (at %) | Initial value of contact resistance (mΩ·cm²) | Results of evaluation of durability (mΩ·cm²) | Power generation test (mΩ·cm²) | Test results |
|---|---|---|---|---|---|---|---|---|---|---|
| 78 | 1.0 | 35 | f, e, d | TiN | 0.5 | 35 | 2 | 5 | | Initial contact resistance and durability both "passed" |
| 79 | 0.7 | 45 | f, e, d | TiN | 0.7 | 40 | 2 | 4 | | Initial contact resistance and durability both "passed" |
| 80 | 1.0 | 55 | f, e, d | TiN | 0.7 | 37 | 3 | 7 | | Initial contact resistance and durability both "passed" |
| 81 | 0.8 | 30 | f, e, d | TiN | 0.8 | 33 | 2 | 4 | | Initial contact resistance and durability both "passed" |
| 82 | 0.7 | 33 | f, e, d | TiN | 0.5 | 40 | 3 | 4 | | Initial contact resistance and durability both "passed" |
| 83 | 0.9 | 45 | f, e, d | TiN | 0.4 | 33 | 7 | 6 | | Initial contact resistance and durability both "passed" |
| 84 | 0.5 | 51 | f, e, d | TiN | 0.3 | 27 | 2 | 4 | | Initial contact resistance and durability both "passed" |
| 85 | 0.8 | 37 | f, e, d | Ti₂N | 0.05 | 16 | 8 | 8 | | Initial contact resistance and durability both "passed" |
| 86 | 1.5 | 31 | f, e, d | TiN | 1.2 | 48 | 2 | 214 | | Low acid concentration, Ti compound excessive, durability "not passing" |
| 87 | 1.7 | 35 | f, e, d | TiN | 1.7 | 45 | 4 | 140 | | Low acid treatment temperature, Ti compound excessive, durability "not passing" |
| 88 | 1.3 | 55 | f, e, d | TiN | 1.2 | 41 | 7 | 155 | | Short acid treatment time, Ti compound excessive, durability "not passing" |
| 89 | 1.5 | 41 | f, e, d | TiN | 0.04 | 4 | 15 | 20 | | Long acid treatment time, Ti compound excessively small, initial contact resistance "not passing" |
| 90 | 1.2 | 37 | f, e, d | TiN | 0.03 | 2 | 21 | 25 | | Acid treatment temperature high, Ti compound excessively small, initial contact resistance "not passing" |
| 91 | 1.4 | 34 | f, e, d | TiC | 0.04 | 2 | 18 | 30 | | Acid concentration high, Ti compound excessively small, initial contact resistance "not passing" |
| 92 | 1 | 50 | f, e, d | TiC | 0.06 | 35 | 2 | 5 | | Initial contact resistance and durability both "passed" |
| 93 | 0.1 | 74 | f, e, d | TiC | 0.05 | 6 | 7 | 8 | 10 | Initial contact resistance and durability both "passed" |
| 94 | 1 | 56 | f, e, d | TiC | 1 | 15 | 4 | 5 | | Initial contact resistance and durability both "passed" |
| 95 | 0.7 | 48 | f, e, d | TiC | 0.4 | 23 | 2 | 3 | | Initial contact resistance and durability both "passed" |
| 96 | 0.5 | 34 | f, e, d | TiC | 0.08 | 40 | 1 | 3 | 7 | Initial contact resistance and durability both "passed" |
| 97 | 0.9 | 48 | f, e, d | TiC | 0.9 | 5 | 3 | 4 | 10 | Initial contact resistance and durability both "passed" |
| 98 | 0.6 | 25 | f, e, d | TiC | 0.1 | 8 | 2 | 3 | 10 | Initial contact resistance and durability both "passed" |

TABLE 3-4

| Test no. | Thickness of film (μm) | Surface coverage of film (%) | Titanium oxide forming film | Titanium compound particles | Diameter of titanium compound particles (μm) | Content of nitrogen and carbon in film (at %) | Initial value of contact resistance (mΩ·cm²) | Results of evaluation of durability (mΩ·cm²) | Power generation test (mΩ·cm²) | Test results |
|---|---|---|---|---|---|---|---|---|---|---|
| 99 | 1.2 | 35 | f, e, d | TiC | 0.04 | 4 | 18 | 20 | | Long acid treatment time, Ti compound excessively small, initial contact resistance "not passing" |
| 100 | 1.6 | 45 | f, e, d | TiC | 1.5 | 48 | 6 | 168 | | Short acid treatment time, Ti compound excessive, durability "not passing" |

TABLE 3-4-continued

| Test no. | Thickness of film (μm) | Surface coverage of film (%) | Titanium oxide forming film | Titanium compound particles | Diameter of titanium compound particles (μm) | Content of nitrogen and carbon in film (at %) | Initial value of contact resistance (mΩ·cm²) | Results of evaluation of durability (mΩ·cm²) | Power generation test (mΩ·cm²) | Test results |
|---|---|---|---|---|---|---|---|---|---|---|
| 101 | 1.1 | 15 | f, e, d | TiC | 0.04 | 2 | 19 | 31 | | Acid concentration high, Ti compound excessively small, initial contact resistance "not passing" |
| 102 | 1.5 | 40 | f, e, d | TiC | 1.3 | 41 | 1 | 118 | | Low acid concentration, Ti compound excessive, durability "not passing" |
| 103 | 1 | 36 | f, e, d | Ti₂C | 1 | 38 | 2 | 2 | | Initial contact resistance and durability both "passed" |
| 104 | 0.8 | 48 | f, e, d | Ti₂C | 0.8 | 15 | 8 | 8 | | Initial contact resistance and durability both "passed" |
| 105 | 1 | 21 | f, e, d | Ti₂C | 0.7 | 27 | 6 | 7 | | Initial contact resistance and durability both "passed" |
| 106 | 1.4 | 25 | f, e, d | TiC | 1.4 | 45 | 1 | 129 | | Low acid concentration, Ti compound excessive, durability "not passing" |
| 107 | 1.2 | 23 | f, e, d | TiC | 1.2 | 42 | 2 | 187 | | Short acid treatment time, Ti compound excessive, durability "not passing" |
| 108 | 1.5 | 33 | f, e, d | TiC | 1.5 | 44 | 6 | 178 | | Low acid treatment temperature, Ti compound excessive, durability "not passing" |
| 109 | 1.1 | 54 | f, e, d | TiC | 0.7 | 3 | 15 | 18 | | Acid concentration high, Ti compound excessively small, initial contact resistance "not passing" |
| 110 | 1 | 35 | f, e, d | TiC | 1 | 38 | 5 | 6 | | Initial contact resistance and durability both "passed" |
| 111 | 0.8 | 48 | f, e, d | TiC | 0.8 | 28 | 3 | 7 | | Initial contact resistance and durability both "passed" |
| 112 | 1.4 | 45 | f, e, d | TiC | 0.04 | 4 | 15 | 20 | | Long acid treatment time, Ti compound excessively small, initial contact resistance "not passing" |
| 113 | 1.1 | 22 | f, e, d | TiC | 0.02 | 4 | 16 | 32 | | Acid temperature high, Ti compound excessively small, initial contact resistance "not passing" |
| 114 | 1 | 47 | f, e, d | TiC | 0.05 | 38 | 4 | 7 | | Initial contact resistance and durability both "passed" |
| 115 | 0.5 | 26 | f, e, d | TiC | 0.2 | 37 | 4 | 8 | | Initial contact resistance and durability both "passed" |
| 116 | 0.8 | 28 | f, e, d | TiC | 0.8 | 28 | 5 | 7 | | Initial contact resistance and durability both "passed" |
| 117 | 1 | 45 | f, e, d | TiC | 1 | 40 | 2 | 2 | 3 | Initial contact resistance and durability both "passed". Power generation, test also "passed". |
| 118 | 0.7 | 51 | f, e, d | TiC | 0.7 | 26 | 1 | 5 | | Initial contact resistance and durability both "passed" |

Tests 2, 4, 8, 15 to 21, 26 to 28, 33, 34, 38, 40, 44, 51 to 57, 62 to 64, 69, 70, 73 to 75, 78 to 85, 92 to 98, 103 to 105, 110, 111, and 114 to 118 had an amount of carbon of the titanium surface after cold rolling, a dew point of the annealing atmosphere, a gas pressure, a heating temperature, a heating time, a concentration of the pickling solution, a temperature of the pickling solution, and a pickling time all within the ranges of the present invention and had a thickness of the film, a surface coverage rate by the film, a type of titanium oxide forming the film, a type of titanium compound in the film, a diameter of titanium compound particles in the film, and a value of the amount of formation of titanium compound particles in the film evaluated by the amounts of C and N within the ranges of the present invention, so had an initial contact resistance of 10 mΩ·cm² or less. The results of evaluation of durability were also "passed" as the contact resistance was 10 mΩ·cm² or less.

Regarding Tests 2, 8, 15, 44, 51, and 117, a power generation test was run for 5000 hours (18×10⁶ seconds). As a result, the contact resistance against carbon paper after the test was 10 mΩ·cm² or less. A good correlation was seen between the contact resistance value after the durability test and the contact resistance value after the power generation test. It was learned that samples which passed the durability test also passed the power generation test.

Tests 4, 18, 40, 54, 60, 93, 97, and 98 had contents of nitrogen and carbon in the film of 10 at % or less, so while the contact resistance value after the power generation test was "passed", the value tended to be large.

Tests 16, 51, 52, 53, 57, 64, 93, and 96 had a thickness of the film of 500 nm or less, so while the contact resistance value after the power generation test was "passed", the value tended to be large.

Tests 1 and 37 are comparative examples. The amount of carbon at the titanium surface after cold rolling exceeded 200 mg/cm², so the amount of titanium compound in the film became excessive and the initial contact resistance was low, but the durability was "not passing".

Tests 5 and 41 are comparative examples. The amount of carbon at the titanium surface after cold rolling was less than 10 mg/cm², so the amount of titanium compound in the film became excessively small and both the initial contact resistance and the durability were "not passing".

Tests 6 and 42 are comparative examples. The dew point of the annealing atmosphere was higher than −40° C., so the titanium surface became oxidized and the initial contact resistance was "not passing".

Tests 7, 43, and 76 are comparative examples. The heating temperature in the annealing was higher than 950° C. and the heating time was longer than 120 seconds, so the amount of titanium compound in the film became excessive, the diameter of the titanium compound particles became larger than 1 μm, and the durability was "not passing".

Tests 3, 39, and 77 are comparative examples. The heating temperature in the annealing was lower than 700° C., so the value of the amount of formation of titanium compound particles in the film evaluated by the amounts of C and N in the film was less than 5 at % and the initial contact resistance was "not passing".

Tests 13, 36, 49, 72, 90, and 113 are comparative examples. The temperature of the pickling solution in the pickling was higher than the range of the present invention, so the value of the amount of titanium compound in the film evaluated by the contents of C and N was smaller than 5 at %, and the initial contact resistance was "not passing".

Tests 10, 31, 46, 67, 87, and 108 are comparative examples. The treatment temperature of the pickling was the lower than the range of the present invention, the value of the amount of titanium compound in the film evaluated by the contents of C and N in the film was larger than 40 at % and the initial contact resistance was low, but the evaluation of the durability was "not passing".

Tests 12, 22, 35, 48, 58, 71, 89, 99, and 112 are comparative examples. The time of the pickling was longer than 180 seconds, so the value of the amount of titanium compound in the film evaluated by the contents of C and N was excessively smaller than 5 at % and the initial contact resistance was "not passing".

Tests 11, 23, 30, 47, 59, 66, 88, 100, and 107 are comparative examples. The pickling time was shorter than 5 seconds, so the value of the amount of titanium compound in the film evaluated by the contents of C and N in the film was greater than 40 at %, and the initial contact resistance was low, but the evaluation of the durability was "not passing".

Tests 14, 24, 32, 50, 60, 68, 91, 101, and 109 are comparative examples. The acid concentration of the pickling solution was higher than the range of the present invention, so the value of the amount of titanium compound in the film evaluated by the contents of C and N was excessively smaller than 5 at % and the initial contact resistance was "not passing".

Tests 9, 25, 29, 45, 61, 65, 86, 102, and 106 are comparative examples. The acid concentration of the pickling solution was low, so the value of the amount of titanium compound in the film evaluated by the contents of C and N was larger than 40 at % and the initial contact resistance was low, but the evaluation of the durability was "not passing".

REFERENCE SIGNS LIST

1 solid polymer fuel cell
2 solid polymer film
3 catalyst electrode parts
4 carbon paper
5 separator
6 anode side
7 cathode side
8 hydrogen gas
9 air
10 electrons
11 titanium material for solid polymer fuel cell separator
12 titanium base material
13 film
14 titanium compound particles
15 titanium oxide
16 conductor

The invention claimed is:

1. A titanium material for solid polymer fuel cell separator use, comprising a titanium base material on the surface of which is provided a film comprised of titanium oxide having a thickness of 100 nm to 1 μm and a surface coverage rate of said titanium base material by said film of 20% or more; said film further comprising conductive titanium compound particles of a spherical shape and having an average diameter of 50 nm to 1 μm, wherein said conductive titanium compound particles are comprised of one or both of carbon and nitrogen with titanium and the total content of carbon and nitrogen in the film is 5 to 40 at %, and wherein said particles are arranged to directly contact both the titanium base material and a carbon paper and/or are arranged such that two or more conductive titanium compound particles connect in the film such that the connecting particles directly contact both the titanium base material and the carbon paper.

2. The titanium material for solid polymer fuel cell separator use as set forth in claim 1, wherein said titanium oxide is comprised of an oxide of one or more oxides selected from $Ti_4O_5$, $Ti_3O_5$, $Ti_2O_3$, $TiO_2$, $TiO$, or amorphous state titanium oxide of an indeterminate ratio of composition.

3. The titanium material for solid polymer fuel cell separator use as set forth in claim 1, wherein said titanium compound particles are comprised of one or more compounds selected from $TiN$, $Ti_2N$, $TiN_{0.96}$, $TiC$, $Ti_2C$, $TiC_{0.98}$, $Ti_2CN$, $TiC_{0.7}N_{0.3}$, $TiC_{0.62}$, $TiC_{0.59}$, $TiN_{0.12}C_{0.51}$, $TiC_{0.3}N_{0.7}$, and $TiC_{0.2}N_{0.8}$.

4. The titanium material for solid polymer fuel cell separator use as set forth in claim 1, wherein the total content of carbon and nitrogen in said film is 10 to 40 at %.

* * * * *